United States Patent
Guan et al.

(10) Patent No.: US 10,752,826 B2
(45) Date of Patent: *Aug. 25, 2020

(54) NANOGELS FOR DELAYED GELATION

(71) Applicants: ConocoPhillips Company, Houston, TX (US); University of Kansas, Lawrence, KS (US)

(72) Inventors: Huili Guan, Lawrence, KS (US); Cory Berkland, Lawrence, KS (US); Ahmad Moradi-Araghi, Tulsa, OK (US); Jenn-Tai Liang, College Station, TX (US); Terry M. Christian, Bartlesville, OK (US); Riley B. Needham, Bartlesville, OK (US); Min Cheng, Bartlesville, OK (US); Faye Lynn Scully, Bartlesville, OK (US); James H. Hedges, Bartlesville, OK (US)

(73) Assignees: ConocoPhillips Company, Houston, TX (US); University of Kansas, Lawrence, KS (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/708,034

(22) Filed: Sep. 18, 2017

(65) Prior Publication Data
US 2018/0002592 A1    Jan. 4, 2018

Related U.S. Application Data

(63) Continuation of application No. 14/143,169, filed on Dec. 30, 2013, now Pat. No. 9,796,909.

(60) Provisional application No. 61/754,060, filed on Jan. 18, 2013.

(51) Int. Cl.
| | |
|---|---|
| *C09K 8/22* | (2006.01) |
| *C09K 8/588* | (2006.01) |
| *C08L 1/28* | (2006.01) |
| *C08L 5/00* | (2006.01) |

(52) U.S. Cl.
CPC ............. *C09K 8/588* (2013.01); *C08L 1/286* (2013.01); *C08L 5/00* (2013.01)

(58) Field of Classification Search
CPC ...... E21B 43/16; E21B 43/162; E21B 43/164; E21B 43/2401; E21B 43/243; E21B 43/263; E21B 43/40; E21B 47/0001; E21B 47/0002; E21B 47/06; E21B 47/18; E21B 49/005; E21B 49/006; E21B 49/087; E21B 4/00; E21B 4/02; E21B 7/00; E21B 7/02; E21B 7/06; E21B 7/061; E21B 7/203; E21B 7/24; E21B 19/09; E21B 2023/008; E21B 2034/005; E21B 2034/007; E21B 21/015; E21B 21/063; E21B 21/08; E21B 23/01; E21B 23/04; E21B 25/16; E21B 33/043; E21B 33/10; E21B 33/12; E21B 33/13; E21B 43/26; E21B 43/2406; E21B 10/32; E21B 10/567; E21B 33/03; E21B 43/25; E21B 10/26; E21B 10/46; E21B 10/55; E21B 10/5673; E21B 19/22; C09K 8/805; C09K 2208/00; C09K 5/048; C09K 5/10; C09K 8/035; C09K 8/42; C09K 8/514; C09K 8/54; C09K 8/584; C09K 8/594; C09K 8/74; C09K 8/22; C09K 8/08
See application file for complete search history.

(56) References Cited

U.S. PATENT DOCUMENTS

| | | | | |
|---|---|---|---|---|
| 2,759,909 A * | 8/1956 | Hiatt | ......................... | C08F 8/14 525/366 |
| 5,338,465 A * | 8/1994 | Lockhart | ............... | C07F 11/005 166/295 |
| 5,423,380 A * | 6/1995 | Johnston | ................ | C09K 8/512 166/294 |
| 5,642,783 A * | 7/1997 | Moradi-Araghi | ...... | C09K 8/512 166/295 |
| 6,454,003 B1 * | 9/2002 | Chang | .................... | C09K 8/512 166/270 |
| 2003/0119678 A1 * | 6/2003 | Crews | .................... | C09K 8/685 507/100 |
| 2005/0194139 A1 * | 9/2005 | Hanes, Jr. | ................ | C09K 8/06 166/278 |
| 2008/0269083 A1 * | 10/2008 | Argillier | ................ | C09K 8/528 507/219 |
| 2012/0037364 A1 * | 2/2012 | Guan | ...................... | C09K 8/88 166/270 |

OTHER PUBLICATIONS http://www.glossary.oilfield.slb.com/Terms/g/gel.aspx downloaded on Apr. 7, 2017.*

* cited by examiner

*Primary Examiner* — Kumar R Bhushan
(74) *Attorney, Agent, or Firm* — Boulware & Valoir

(57) ABSTRACT

The instant application relates to nanogels or compositions that hold multivalent metal ions until some level of nanogel degradation has occurred, then slowly release the multivalent metal ions for gelation with carboxylate containing polymers. Compositions comprising such nanogels, together with polymers that can be crosslinked with multivalent metal ions, allow the deployment of such mixtures in various applications, and greatly increased gelation times.

2 Claims, 16 Drawing Sheets

| Nanogel | Polymer | Metal ion Cr(III) loading | Ratio of COOH:Cr(III), mole/mole | Method |
|---|---|---|---|---|
| Cr-Nanogel-27 | 135 mg PVAS-25 | 1500 ppm Cr | 6:1 | Solution |
| Cr-Nanogel-28 | 101 mg PVAS-25 | 1500 ppm Cr | 4.5:1 | Solution |
| Cr-Nanogel-30 | 68 mg PVAS-25 | 1500 ppm Cr | 3:1 | Solution |

| Nanogel | Polymer | Metal ion Cr(III) loading | Ratio of COOH:Cr(III), mole/mole | Method |
|---|---|---|---|---|
| Cr-Nanogel-27 | 135 mg PVAS-25 | 1500 ppm Cr | 6:1 | Solution |
| Cr-Nanogel-29 | 143 mg PVAS-6 | 1500 ppm Cr | 6:1 | Solution |

| Nanogel | Polymer | Metal ion Cr(III) loading | Ratio of COOH:Cr(III), mole/mole | Method |
|---|---|---|---|---|
| Cr-Nanogel-32* | 794 mg PVAS-6 | 3600 ppm Cr | 6:1 | Inverse emulsion |
| *Nanogels were prepared in NaOH solution | | | | |

| Nanogel | Polymer | Metal ion Cr(III) loading | Ratio of COOH:Cr(III), mole/mole | Method |
|---|---|---|---|---|
| Cr-Nanogel-33* | 368 mg PVAS-25 | 3600 ppm Cr | 6:1 | Inverse emulsion |
| *Nanogels were prepared in NaOH solution | | | | |

| Nanogel | Polymer | Metal ion Cr(III) loading | Ratio of COOH:Cr(III), mole/mole | Method |
|---|---|---|---|---|
| Cr-Nanogel-33 | 368 mg PVAS-25 | 3600 ppm Cr | 6:1 | Inverse emulsion |

| Nanogel | Polymer | Metal ion Zr(IV) loading | Ratio of COOH:Zr(IV) mole/mole | Method |
|---|---|---|---|---|
| Zr-Nanogel-43 | 328 ppm PVAS-6 | 4463 ppm Zr | 6:1 | solution |

| Nanogel | Polymer | Metal ion Cr(III) loading | Ratio of COOH:Cr(III), mole/mole | Method |
|---|---|---|---|---|
| Cr-PAsp Nanogel-2 | 921 ppm PAsp acid | 6837 ppm Cr | 7:1 | Inverse emulsion |

| Nanogel | Polymer | Metal ion Cr(III) loading (CrCl₃ as Cr(III) source) | Ratio of COOH:Cr(III), mole/mole | Method |
|---|---|---|---|---|
| CrCl$_3$-PVAS | 573 ppm PVAS | 1867 ppm | 6:1 | Solution |

| Nanogel | Polymer | Metal ion Cr(III) loading (CrCl$_3$ as Cr(III) source) | Ratio of COOH:Cr(III), mole/mole | Method |
|---|---|---|---|---|
| CrCl$_3$-PAsp-1 and CrCl$_3$-PAsp-2 | 653 ppm PAsp | 2452 ppm | 6:1 | Solution |

| Nanogel | Polymer | Metal ion Cr(III) loading (CrCl₃ as Cr(III) source) | Ratio of COOH:Cr(III), mole/mole | Method |
|---|---|---|---|---|
| CrCl$_3$-PAsp-1 and CrCl$_3$-PAsp-2 | 653 ppm PAsp | 2452 ppm | 6:1 | Solution |

| Nanogel | Polymer | Metal ion Cr(III) loading (CrCl$_3$ as Cr(III) source) | Ratio of COOH:Cr(III), mole/mole | Method |
|---|---|---|---|---|
| CrCl$_3$-PAsp-1 and CrCl$_3$-PAsp-2 | 653 ppm PAsp | 2452 ppm | 6:1 | Solution |

| Nanogel | Polymer | Metal ion Cr(III) loading (CrCl₃ as Cr(III) source) | Ratio of COOH:Cr(III), mole/mole | Method |
|---|---|---|---|---|
| CrCl₃-PAsp-1 and CrCl₃-PAsp-2 | 653 ppm PAsp | 2452 ppm | 6:1 | Solution |

NANOGELS FOR DELAYED GELATION

PRIOR RELATED APPLICATIONS

This application is a continuation of U.S. Ser. No. 14/143,169 filed Dec. 30, 2013, which claims priority to U.S. Ser. No. 61/754,060, filed on Jan. 18, 2013. Each application is incorporated by reference in its entirety herein for all purposes.

FEDERALLY SPONSORED RESEARCH STATEMENT

Not applicable.

REFERENCE TO MICROFICHE APPENDIX

Not applicable.

FIELD OF THE DISCLOSURE

The disclosure relates to delayed gelling agents that can be deployed in oil and gas reservoirs, as well as any other agriculture, remediation, mining or other industrial uses.

BACKGROUND OF THE DISCLOSURE

The challenge for all oil and gas companies is to produce as much oil as commercially feasible, leaving as little oil as possible trapped inside the reservoir. During the primary recovery stage, reservoir drive comes from a number of natural mechanisms. These include natural water pushing oil towards the well, expansion of the natural gas at the top of the reservoir, expansion of gas initially dissolved in the crude oil, and gravity drainage resulting from the movement of oil within the reservoir from the upper regions to lower regions where the wells are located. Recovery factor during the primary recovery stage is typically about 5-15% under such natural drive mechanisms.

Over the lifetime of a well, however, the pressure will eventually fall, and at some point there will be insufficient underground pressure to force the oil to the surface. Once the natural reservoir drive diminishes, secondary and tertiary recovery methods are applied to further increase recovery. Secondary recovery methods rely on the supply of external energy into the reservoir in the form of injecting fluids to increase reservoir pressure, hence replacing or increasing the natural reservoir drive with an artificial drive. In addition, pumps, such as beam pumps, pumps with gas lift and electrical submersible pumps (ESPs), can be used to bring the oil to the surface. Secondary recovery techniques include increasing reservoir pressure by water injection, $CO_2$ injection, natural gas reinjection, and miscible injection, the most common of which is probably water injection. Typical recovery factor from water-flood operations is about 30%, depending on the properties of oil and the characteristics of the reservoir rock. On average, the recovery factor after primary and secondary oil recovery operations is between 35 and 45%.

While secondary recovery techniques are fairly effective, the existence of fractures and regions of highly porous or permeable rock reduce their potential effectiveness. Any gas or liquid that is injected into a well, will naturally travel the least restrictive route, thus bypassing some of the oil in the less porous or permeable regions. Thus, the overall effectiveness of the sweep is reduced by these so-called "thief zones," which channel injection fluid directly to production wells.

In such cases, polymers are injected into the thief zones in order to block these zones, thus diverting the subsequent injection fluids to push previously unswept oil towards the production wells. Gels have been applied in enhanced oil recovery to improve the sweep efficiency, prolong the life of an oil well and maximize the recoverable oil amount by placing the gelants deep into the reservoir and blocking the high-permeability channels.

One of the difficulties involving the use of gelants to block thief zones, though, is increasing the viscosity of the gelants. Viscous gelants are difficult to pump and can shear during pumping, making it more difficult and expensive to get the viscous solutions deep into the reservoir, yet high viscosity is needed to block the thief zones. For this reason, there is considerable effort directed to delaying the further cross-linking of polymers until they have already penetrated deep into the reservoir.

Among the polymers used for such purposes, partially hydrolyzed polyacrylamide (HPAM) cross linked with Cr (III) gels have been widely used for water shutoff and sweep improvement in field applications. Other metal ions that can further crosslink polymers containing anionic sites include zirconium, titanium, iron, aluminum and combinations thereof.

Usually these metallic ions crosslink gellable polymers through the interaction with e.g., the carboxylate groups of the polymer molecules. Generally, the gellable polymers used such as, for example, polyacrylamide are of high molecular weight and contain high degrees of hydrolysis, i.e., contain 10-30 mole % carboxylate groups. However, these high molecular weight and/or high mole % carboxylate group-containing polymers gel almost instantly in the presence of the above-described multivalent metallic compounds. Such fast gelation rate renders the application of gelling compositions containing these polymers and multivalent metallic compounds not useful in many oil-field applications such as, for example, water shut-offs and permeability reductions, since the gelant crosslinks before it has had a chance to penetrate the reservoir, thus stopping its flow. Furthermore, the resulting gels typically synerese heavily in most oil-field brines, depending on reservoir temperature and the divalent cation content of the brine.

Many efforts have been directed to delaying the gelation of such polymers by adding a gelation delaying agent to the compositions. The use of ligands complexed with multivalent cations such as Al(III), Cr(III), Ti(IV) and Zr(IV) to crosslink partially hydrolyzed polyacrylamides (HPAM) has been a common practice to slow the rate of reactions of these cations with HPAM. The presence of ligands such as acetate, citrate, propionate, malonate, etc., which bind to multivalent cations, inhibit rapid interaction of the multivalent cations with the negative sites of HPAM to produce gels, thus delaying the rate of gelation.

An extensive study (Albonico 1993) performed on evaluating various retarding ligands, ranked the effectiveness of hydroxycarboxylates, dicarboxylates and aminocarboxylates on retarding the gelation rate of Cr(III) with HPAM solutions. This study showed that malonate ions are 33 times slower than acetate to gel 0.5% HE-100, a copolymer of acrylamide and sodium AMPS, at 120° C. This study ranked ascorbate to be 51 times slower than acetate under the same conditions. The authors further tested the effectiveness of various ligands in propagation of Cr(III) ions in both sandstone and carbonate formations. They concluded that malonate ions are most effective in promoting propagation of Cr(III) in porous media, preventing precipitation and thus retention of Cr(III).

While the rates of gelation of HPAM with complexes of multivalent cations are slower than for un-complexed multivalent cations, they are still not slow enough. Extensive gelation tests with complexes of multivalent cations with HPAM indicate formation of non-flowing gels within a few hours, not long enough for deep placement of the gelants before reaching the non-flowing stage. Additionally, the integrity of the stabilized package due to chromatographic separation might hinder their effectiveness of such systems in treating high permeability targets deep in porous media matrix.

Extending the gelation times from a few hours to days or weeks, is therefore, highly desirable for the placement of the gelants deep in matrix target zones. Further, a less toxic package that is very stable in various brines and at typical reservoir temperatures would also be desirable, since the increased stability will allow deeper deployment.

SUMMARY OF THE DISCLOSURE

The present disclosure teaches the formation of degradable nanogels produced with multivalent cations. Such degradable nanogels can be injected along with another anionic polymers, such as HPAM, into the target zones, at which time the labile bonds in the nanogel break, slowly releasing the multivalent cation, and allowing it to react with the anionic sites of the second anionic polymer to produce gels and block high permeability channels.

A large variety of novel polymeric nanogels are shown herein, including those produced with the reaction of a complex multivalent cation, such as Cr(III) acetate, and a carboxylated polymer, such as polyvinyl alcohol succinate (PVA succinate) with PVA molecular weights of 6 kDa and 25 kDa (FIGS. 1 and 2), as well as similar nanogels made with zirconium ions, and small particle nanogels made with inverse emulsion techniques. Nanogels made with carboxylated polypeptides, such as polyasparate, are also shown.

All nanogels are shown to significantly delay gelling of a variety of polymers, at varying temperatures, and thus are suitable for reservoir use. Nanogels produced with PVA succinate or polyaspartate and Cr(III) chloride which is cheaper than Cr(III) acetate or Cr (III) propionate were also produced. Such nanogels produce gels with carboxylate containing polymers such as HPAM and B29 at very slow rates to place the gelants deep into the target zones before setting into immobile gels. Addition of Cr(III) chloride to HPAM or B29 polymers under similar conditions result in instant gelation or precipitation.

In the high temperatures of the reservoir environment, the carboxylates or esters or amides of the nanogel break or degrade, thus releasing the multivalent metal ions, which are thus free to crosslink a second polymer also containing pendant carboxylates, thus gelling said polymer in situ.

We have exemplified the degradable nanogels herein using PVA succinate and polyasparate, but it is likely that many other molecules with similar chemistry could be used. Thus, any dicarboxylate that can be dehydrated to form an anhydride can be conjugated to PVA using similar chemical reactions. Thus, maleic anhydride (cis-butenedioic anhydride), is expected to be substitutable in the invention, as are glutaric anhydride, phthalic anhydride, etc. Further, any di- or tricarboxylate can be polymerized and used, based on our success with polyaspartate.

The two main requirements of the degradable nanogel are 1) that it contain pendant carboxylates or other anions for complexing the metal ion, and 2) that it degrades in situ, so as to release the metal ions, for further crosslinking of the reservoir injection polymer, which also contains anionic groups, often carboxylates. Thus, the nanogel will be less chemically stable under reservoir conditions than the injection polymer, which is selected to be stable under the same conditions. Pendant carboxylate groups, esters or amides may all provide the chemistry for the needed degradation.

Further, though we used PVA as a base polymer to add the succinate to, any polymer containing double bonds (such as vinyl, allyl, styrene, acrylamide, etc.). can be conjugated to e.g., succinate anhydride.

Examples of some monomers and their synthesis are shown in FIG. 3 including: N-hydroxylmethyl acrylamide (NHMA) succinate, allyl alcohol succinate and allylamine succinate, each of which may be synthesized through the reaction of NHMA, allyl alcohol and allylamine with e.g., succinic anhydride (or malic anhydride) to make polymers suitable for preparing the degradable nanogels of the invention.

In principle, all polymers containing temporary carboxyl groups can be used to make multivalent metal ion-loaded particles for gelation delay. "Temporary carboxyl groups" or "releasable carboxyl groups" means that carboxyl groups can be removed from polymer chains due to the breaking of a bond or bonds between carboxyl groups and the polymer chain, or by breaking the polymer chain itself (such as polycarbonate containing carboxyl groups or peptides contain carboxyl groups, such as polyaspartic acid and polyglutamic acid, as shown FIG. 4). The carboxyl groups may be conjugated to polymer chains through ester bonds, amide bonds, and the like. The bond type will affect release rate of metal ions. For example, amide bond breaking is typically more difficult than ester bond, so the metal ions released from particles where amide bonds are used may be much slower than particles where ester bonds are used.

Exemplary metal ion containing nanogels are listed in Table 1.

TABLE 1

| Exemplary nanogels | | | | |
|---|---|---|---|---|
| Nanogel | Polymer | Metal ion Cr(III) or Zr(IV) loading | Ratio of COOH:metal, mole/mole | Method |
| Cr-Nanogel-27 | 135 mg PVAS-25 | 1500 ppm Cr | 6:1 | Solution |
| Cr-Nanogel-28 | 101 mg PVAS-25 | 1500 ppm Cr | 4.5:1 | Solution |
| Cr-Nanogel-30 | 68 mg PVAS-25 | 1500 ppm Cr | 3:1 | Solution |
| Cr-Nanogel-29 | 143 mg PVAS-6 | 1500 ppm Cr | 6:1 | Solution |
| Cr-Nanogel-32 | 794 mg PVAS-6 | 3600 ppm Cr | 6:1 | Inverse emulsion |

TABLE 1-continued

Exemplary nanogels

| Nanogel | Polymer | Metal ion Cr(III) or Zr(IV) loading | Ratio of COOH:metal, mole/mole | Method |
|---|---|---|---|---|
| Cr-Nanogel-33* | 368 mg PVAS-25 | 3600 ppm Cr | 6:1 | Inverse emulsion |
| Zr-Nanogel-43 | 328 ppm PVAS-6 | 4463 ppm Zr | 6:1 | Solution |
| Cr-PAsp Nanogel-2* | 921 ppm PAsp acid | 6837 ppm Cr | 7:1 | Inverse emulsion |

*Nanogels were prepared in NaOH solution

The term "carboxylate-containing polymer" used herein in a delayed gelling composition refers to, unless otherwise indicated, a polymer that contains at least one free carboxylic acid group or a carboxylate group in which the proton of the carboxylic acid is substituted with an ammonium ion, an alkali metal ion, an alkaline earth metal ion, or combinations of any two or more thereof, such that the pendant carboxylate groups can be crosslinked with a multivalent metal ion, thus forming a gel.

According to the present disclosure, the molecular weight of the carboxylate-containing polymers is generally at least about 10,000 Da and less than about 25,000,000 Da, preferably less than about 20,000,000 Da.

The mole percent % of the carboxylate group in carboxylate-containing polymers, such as partially hydrolyzed polyacrylamides (HPAM), is generally in the range of from about 0.01 to less than about 45, preferably about 0.1 to less than about 25, more preferably about 0.1 to less than about 15, even more preferably about 0.1 less than about 10, and most preferably 0.2 to 10 mole %.

According to the present invention, the gelation time is defined as the time when the viscosity of the gel solution increases abruptly to a value greater than 1000 cP (100% scales) at a shear rate of 2.25 $s^-$.

The gelation time is generally longer than about 3 days, 5 days, a week, 10 days, 30 days or more, depending on temperature, nanogel composition and crosslinkable polymer composition and concentration.

Carboxylate-containing polymers suitable for use in this invention are those capable of gelling in the presence of a crosslinking agent such as, chromium or zirconium, and are preferably stable at reservoir conditions. Polymers suitable for use in this invention, include, but are not limited to, polysaccharides, such as carboxylated polysaccharides or carboxylated guar, cellulose ethers, such as carboxymethyl cellulose, and acrylamide-containing polymers.

Suitable acrylamide-containing polymers that also contain pendant carboxylate groups are disclosed in U.S. Pat. No. 3,749,172 (herein incorporated by reference in its entirety).

Particularly preferred acrylamide-containing polymers are the so-called partially hydrolyzed polyacrylamides possessing pendant carboxylate groups via which crosslinking can take place. Thermally stable carboxylate-containing polymers of acrylamide, such as terpolymers of N-vinyl-2-pyrrolidone and acrylamide and sodium acrylate; tetrapolymers of sodium-2-acrylamido-2-methylpropanesulfonate, acrylamide, N-vinyl-2-pyrrolidone and sodium acrylate; and terpolymers of sodium-2-acrylamido-2-methylpropanesulfonate and acrylamide and sodium acrylate; terpolymers of N,N dimethylacrylamide and acrylamide and sodium acrylate; and combinations of any two or more thereof, are particularly preferred for applications in high salinity environments at elevated temperatures for stability. Selected carboxylate-containing terpolymers also are useful in the present process, such as tetrapolymers derived from acrylamide, sodium acrylate, and N-vinyl-2-pyrrolidone and N,N-dimethylacrylamide co-monomers with lesser amounts of monomers such as vinyl acetate, vinylpyridine, styrene, methyl methacrylate, and other polymers containing acrylate groups.

Any crosslinking agents, such as e.g. a multivalent metallic compound, that are substantially suspendable in the liquid component of the composition and are capable of crosslinking the carboxylate-containing polymer in the hydrocarbon-bearing formations can be used in the process of the present invention.

Suitable multivalent metal ions include chromium, zirconium, titanium, aluminum and the like. The metal ions can also be complexed with a ligand, such as acetate, propionate, malonate, citrate and the like.

The presently preferred multivalent metallic compound is selected from the group consisting of zirconium compounds, titanium compounds, aluminum compounds, iron compounds, chromium compounds, such as Cr(III) chloride Cr(III) acetate, Cr(III) propionate, and combinations of any two or more thereof. Examples of suitable multivalent metallic compounds include, but are not limited to, sodium zirconium lactate, potassium zirconium lactate, ammonium zirconium lactate, ammonium zirconium carbonate, sodium zirconium carbonate, potassium zirconium carbonate, ammonium zirconium fluoride, ammonium zirconium chloride, zirconium ammonium citrate, zirconium chloride, tetrakis(triethanolamine)zirconate, zirconium carbonate, zirconyl ammonium carbonate, ammonium titanium carbonate, titanium chloride, titanium carbonate, ammonium titanium chloride, and combinations thereof. These compounds are commercially available. The presently most preferred crosslinking agents are sodium zirconium lactate and ammonium zirconium carbonate, chromium acetate, chromium propionate, chromium malonate, chromium (III) chloride, etc.

The concentration of crosslinking agent used in the present invention depends largely on the concentrations of polymer in the composition and the desired gelation delay. Lower concentrations of polymer, e.g., require lower concentrations of the crosslinking agent. Further, it has been found that for a given concentration of polymer, increasing the concentration of crosslinking agent generally substantially decreases the time of gelation (increases the gelation rate). The concentration of crosslinking agent in the injected slug varies generally over the broad range of about 1 mg/l (ppm) to about 1,000 ppm, preferably over the range of about 1 ppm to about 500 ppm, and most preferably 1 ppm to 200 ppm based on Cr(III).

Any suitable procedures for preparing the aqueous admixtures of the gellable polymers, degradable nanogels, and liquid can be used. Some of the polymers can require particular mixing conditions, such as slow addition of finely powdered polymer into a vortex of stirred brine, alcohol prewetting, and protection from air (oxygen), preparation of stock solutions from fresh rather than salt water, as is known for such polymers.

As used herein, "ppm" refers to parts per million on a weight per weight basis.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| B29 | a swellable microparticle copolymer of acrylamide and sodium acrylate crosslinked with poly(ethylene glycol) (258) diacrylate and methylene bisacrylamide, swells or expands when labile diacrylate bonds break. |
| CrAc | Chromium (III) acetate hydroxide $(CH_3COO)_7Cr_3(OH)_2$ |
| Da | Dalton |
| HPAM | Partially hydrolyzed Polyacrylamide |
| NHMA | N-hydroxylmethyl acrylamide |
| NMP | N-methyl-2-pyrrolidone |
| PAsp | Polyaspartate |
| PSH | polyoxyethylene sorbitol hexaoleate |
| PVA | polyvinyl alcohol |
| PVAM | PVA malate |
| PVAS | PVA succinate |
| PVAS-25 | PVA succinate 25 KDa |
| PVAS-6 | PVA succinate 6 kDa |
| RO | Reverse osmosis |
| TEA | Triethylamine |
| ZrLa | Zirconium (IV) Lactate |

DESCRIPTION OF EMBODIMENTS OF THE INVENTION

Figure 1:
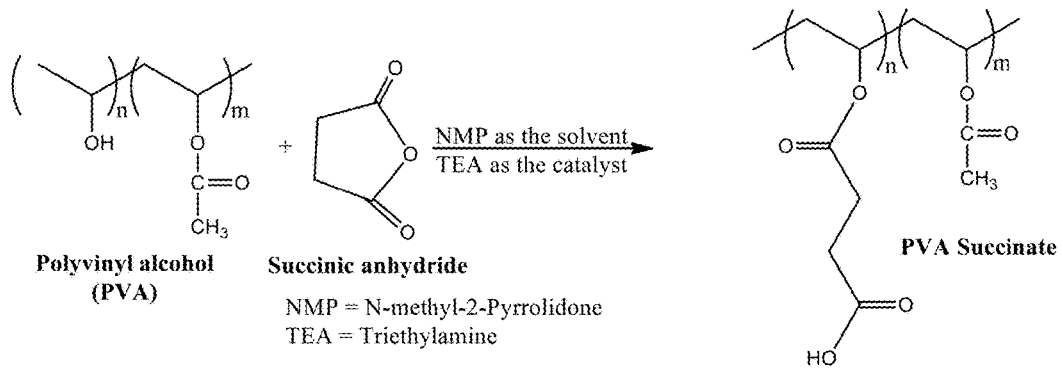
FIG. 1 depicts the synthesis of PVA succinate.
Figure 2:
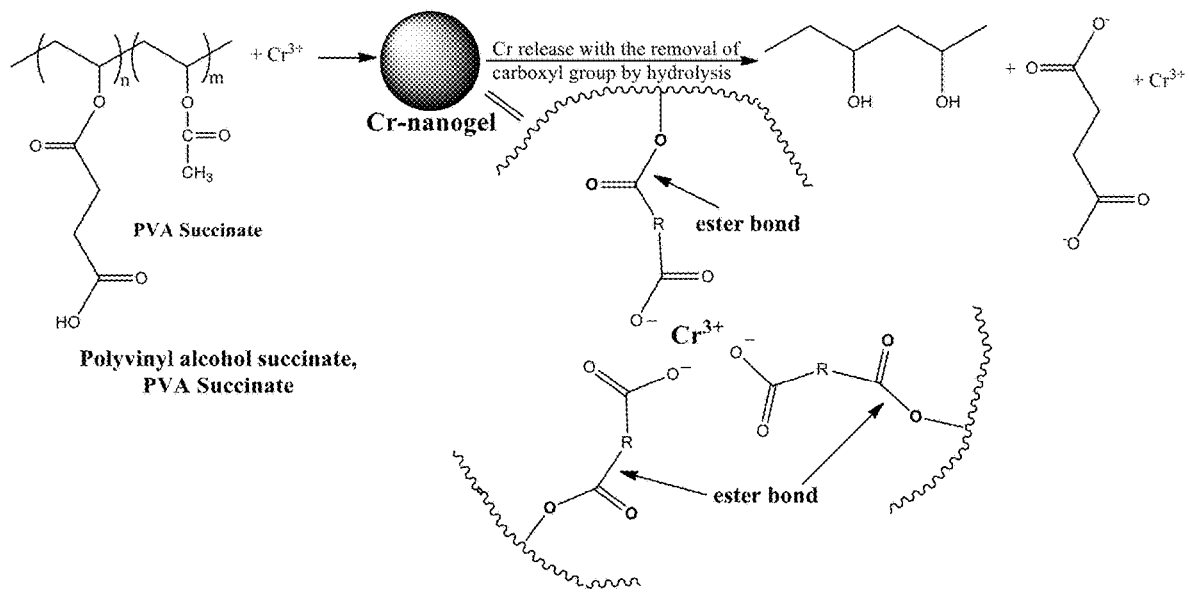
FIG. 2 shows the basic concept of multivalent metal ion-loaded nanogel for gelation.
Figure 3:
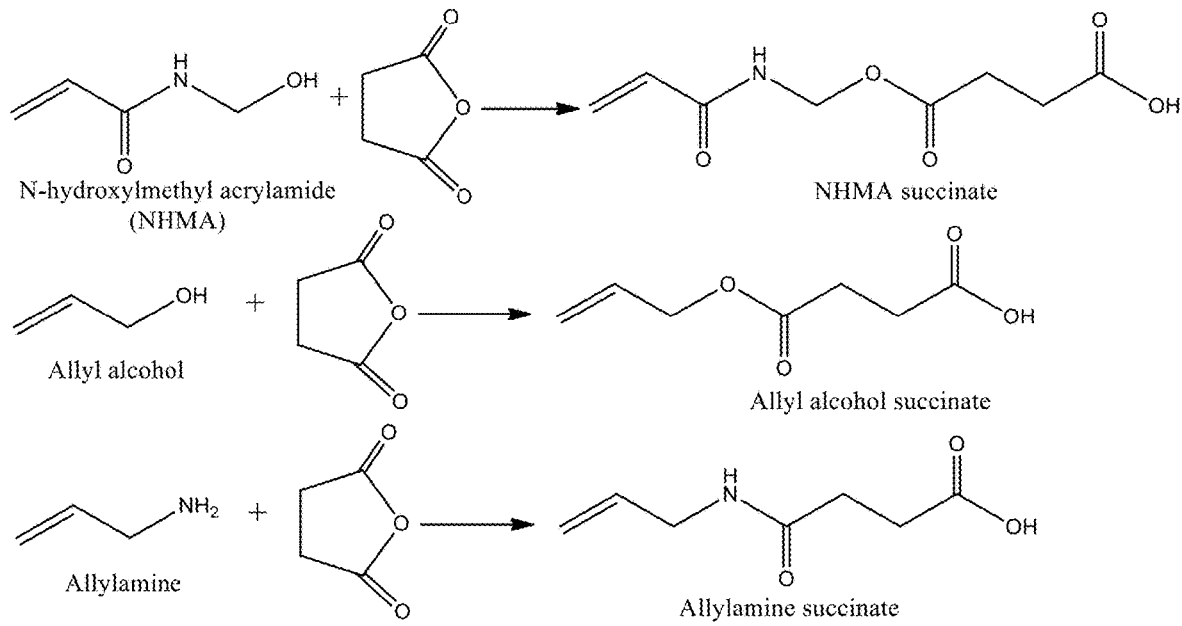
FIG. 3 shows synthesis of NHMA succinate, allyl alcohol succinate and allylamine succinate.
Figure 4:
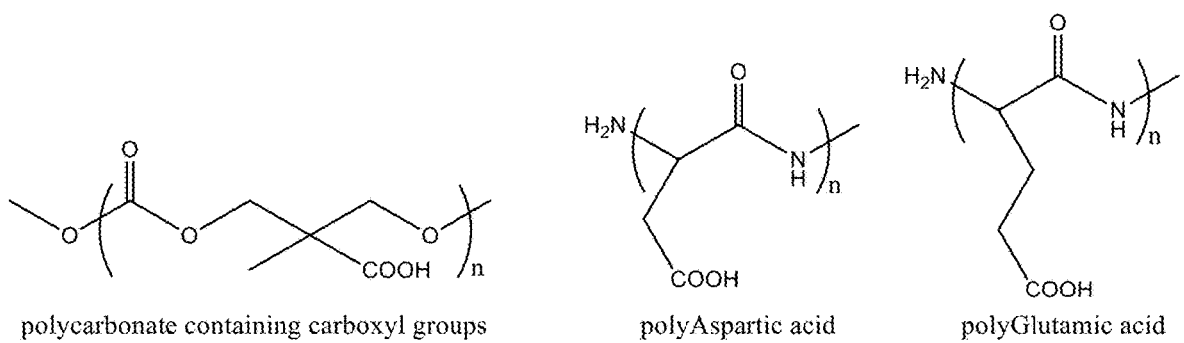
FIG. 4 displays examples of temporary carboxyl groups, including polycarbonate-containing carboxyl groups, polyaspartate and polyglutamate, that could be used to make degradable nanogels pursuant to this disclosure.

The disclosure provides novel compositions and methods, including any one or more of the following embodiments:

A degradable composition is provided, comprising a polymer having labile or releasable carboxylate groups complexed with a multivalent metal ion, said degradable composition lasting at least 5 days at 85° C. in a brine solution having 23 g/l NaCl, and thereafter degrading said composition and releasing said multivalent metal ion. Degradation is thus to be ascertained by release of the multivalent metal ion, which is ascertained by a second polymer gelling, as shown in the viscosity increase experiments described herein.

In preferred embodiments, the composition is a nanogel, but this is not an absolute requirement. Nanogels include particles of less than one micron, preferably 200-500, and most preferably 400 nm.

The polymer used to form nanogel can be made from monomers selected from the group of vinyl, allyl, styrene, and acrylamide monomers and their derivatives, or any polysaccharide, conjugated with a dicarboxylate or having naturally appended carboxylate groups. Any dicarboxylate (or tricarboxylate) can be used, including citrate, succinate, aspartate, glutamate, malate, oxalate, malonate, glutarate, adipate, pimelate, and the like, or a derivative thereof.

In some embodiments, the degradable nanogel having carboxylate groups is a polymer or copolymer of citrate, succinate, aspartate, glutamate, malate, oxalate, malonate, glutarate, adipate, pimelate, carbonate, and the like, or derivatives thereof.

In some preferred embodiments, the nanogel comprises polyvinyl alcohol (PVA) succinate, N-hydroxylmethyl acrylamide (NHMA) succinate, allyl alcohol succinate and allylamine succinate, PVA malate, NHMA malate, allyl alcohol malate or allylamine malate. In other embodiments, the polymer is polyaspartate or polyglutamate, or the like.

The multivalent metal ion is any such ion whose presentation needs be delayed, and for reservoir use for tertiary crosslinking includes chromium, zirconium, iron, aluminum, and titanium.

In some embodiments, the nanogel is PVA succinate and chromium or zirconium. In others, it is PVA malate and chromium or zirconium. In yet others, it is polyaspartate and chromium or zirconium, or polyglutamate and chromium or zirconium. Other exemplary nanogels are selected from Table 1.

Preferably, the carboxylate group to multivalent metal ion molar ratio is increased to delay release of the multivalent cation, and preferred embodiments include ratios from 3:1 to 15:1, or even 20:1. A 6:1 ratio was useful for the delays shown herein, but higher ratios may be preferred for hotter reservoirs.

The multivalent metal ion is present at amounts needed for the application, but in reservoir applications a lower amount is preferred as being more cost effective. Amounts thus range from 10-10,000 ppm or 50-5000 ppm, or about 1-200 ppm, such ppm given as the final weight/weight basis of the complete injection fluid.

Other embodiments provide a degradable nanogel comprising PVA succinate or PVA malate or polyasparate complexed with multivalent metal ion comprising chromium, zirconium, iron, aluminum, titanium or combinations thereof, said degradable nanogel lasting at least 5 days to 10 days at 85° C. in a brine solution having 23 g/1 NaCl, and thereafter degrading said nanogel and releasing said multivalent metal ion. Other degradable nanogels last at least 10 days at 85° C., and/or at least 30 days at 65° C.

Delayed gelling compositions are also provided, comprising any degradable nanogel herein described, admixed with an injection fluid admixed with a carboxylate containing polymer.

Any carboxylate containing polymer can be used in the injection fluid, provided such polymer can be crosslinked with the metal ion in the nanogel. Such polymers include, e.g., partially hydrolyzed polyacrylamide, copolymers of N-vinyl-2-pyrrolidone and sodium acrylate, tetrapolymers of sodium-2-acrylamido-2-methylpropanesulfonate, acrylamide and N-vinyl-2-pyrrolidone and sodium acrylate; and copolymers of sodium-2-acrylamido-2-methylpropanesulfonate and sodium acrylate; and combinations thereof.

Improved methods of sweeping for oil are also provided. In one embodiment, wherein prior methods required blocking thief zones with a polymer, and sweeping a reservoir for oil, the improved method comprising injecting any delayed gelling composition herein described into a reservoir, aging said composition until the viscosity increases, and sweeping the reservoir for oil.

Improved methods of producing oil or gas are also provided, prior methods requiring injecting a polymer into a reservoir and producing oil or gas, the improved methods comprising injecting any of the delayed gelling compositions herein described into a reservoir, aging said composition until the viscosity increases, and producing said oil or gas.

The following experiments were performed to synthesize multivalent metal ion loaded degradable nanogels for use as delayed crosslinking agents to produce gels with anionic polymers deep into oil-bearing formations.

PVA succinate, 6 k. A representative poly(vinyl alcohol succinate), herein referred to as PVA succinate, 6 kDa was prepared through the reaction of poly(vinyl alcohol, Mw 6 k, 80 mol % degree of hydrolysis), (PVA-6) and succinic anhydride using triethylamine (TEA) as catalyst in N-methyl-2-pyrrolidone (NMP) as solvent. First, 10 g PVA-6 was dissolved in 120 g NMP at 80° C. while stirring. Second, the solution was maintained at 60° C. reaction temperature, and 15 g TEA and 15 g succinic anhydride in 40 g NMP were added while stirring. After 22 hours at 60° C., PVA succinate 6 k (PVAS-6) was purified by precipitation in ether and dried under vacuum. FIG. 1 shows the chemical composition of PVAS.

PVA succinate 25K. A representative poly(vinyl alcohol succinate), herein referred to as PVA succinate, 25 kDa was prepared through the reaction of poly(vinyl alcohol, Mw 25 k, 88 mol % degree of hydrolysis) (PVA-25) and succinic anhydride using TEA as catalyst in NMP as solvent. First, 10 g PVA-25 was dissolved in 135 g NMP at 80° C. while stirring. Second, the solution was maintained at 60° C. reaction temperature, and 18 g TEA and 18 g succinic anhydride in 45 g NMP were added while stirring. After 22 hours at 60° C., PVAS-25 was purified by precipitation in ether and dried under vacuum.

Cr-Nanogel-27, 28 and 30 with PVAS-25 and CrAc. A representative Cr(III)-loaded nanogel herein referred to as Cr-nanogel-27 was prepared through mixing PVAS-25 with Cr(III) as CrAc in Reverse Osmosis (RO) water while stirring. 135 mg PVAS-25 was dissolved in 4.84 g RO water and 29 mg Cr-Acetate was added into the above solution while stirring. The carboxyl groups/Cr (III) molar ratio is 6:1. Cr(III) loading in Cr-nanogel-27 was around 1500 ppm. Cr-nanogel-28 and Cr-nanogel-30 having lower carboxyl groups/Cr (III) molar ratio were prepared using the same procedure. Detailed information regarding these nanogels is listed in Table 1.

Cr-Nanogel-29 with PVAS-6 and CrAc. A representative Cr(III)-loaded nanogel herein referred to as Cr-nanogel-29 was prepared through mixing PVAS-6 with Cr(III) as CrAc in RO water while stirring. 143 mg PVAS-6 was dissolved in 4.83 g RO water and 29 mg CrAc was added into the above solution while stirring. The carboxyl groups/Cr(III) molar ratio was 6:1. Cr(III) loading in Cr-nanogel-29 is around 1500 ppm. Detailed information regarding Cr-nanogel-29 is listed in Table 1.

Cr-Nanogel-31 with PVAS-6 and CrAc. Cr-Nanogel-31 was made of PVAS-6 and Cr-acetate in Synthetic Brine A for the compatibility test with brine. Cr-Nanogel-31 looked homogeneous and its gelation delay with HPAM was similar to other nanogels (data not shown), but a lot of bubbles appeared during dissolving PVA succinate in Brine A due to $CO_2$ release resulting from reaction of PVA succinate carboxyl groups with $NaHCO_3$ in Brine A.

Cr-nanogel-32 with PVAS-6 and CrAc by inverse-emulsion. A representative Cr(III)-loaded nanogel herein referred to as Cr-nanogel-32 was prepared using PVAS-6 and CrAc by inverse-emulsion in order to prepare small size particles. In such process, an aqueous mixture containing 794 mg PVAS-6, 158 mg CrAc and 6.0 g RO water as the dispersed phase and an oil mixture of 3.5 g kerosene, 557 mg Span 83 and 313 mg polyoxyethylene sorbitol hexaoleate (PSH) as a continuous phase were prepared. The inverse-emulsion was prepared by mixing the aqueous phase and the oil phase, followed by rapid homogenization using a sonicator. The carboxyl groups/ Cr(III) molar ratio was 6:1. Cr(III) loading in Cr-nanogel-32 was around 3600 ppm. The mean particle size, measured in RO water by dynamic light scattering experiments employing a ZetaPALS zeta potential analyzer (Brookhaven Instruments Corp.), was around 400 nm. Detailed information regarding Cr-nanogel-32 is listed in Table 1.

Cr-Nanogel-33 with PVA succinate, 25 k and CrAc by inverse-emulsion. A representative Cr(III)-loaded nanogel herein referred to as Cr-nanogel-33 was prepared using PVAS-25 and CrAc by inverse-emulsion. In order to increase the solubility and ionization degree of PVA succinate, the partial carboxyl groups of PVA succinate were transformed to sodium carboxylate. In such process, an aqueous mixture containing 368 mg PVAS-25, 62 mg NaOH, 79 mg CrAc and 3.0 g RO water as the dispersed phase and an oil mixture of 1.7 g kerosene, 279 mg Span 83 and 157 mg PSH as continuous phase were prepared. The inverse-emulsion was prepared by mixing the aqueous phase and the oil phase, followed by rapid homogenization using a sonicator. The carboxyl groups/Cr(III) molar ratio was 6:1. Cr(III) loading in Cr-nanogel-33 was around 3600 ppm. The mean particle size was around 400 nm. Detailed information regarding Cr-nanogel-33 is listed in Table 1.

Zr-Nanogel-43 with PVA succinate, 6 k and ZrLa. In order to compare chromium ions against zirconium ions, a representative Zr(IV)-loaded nanogel herein referred to as Zr-nanogel-43 was prepared through mixing PVAS-6 with Zr(IV) as Zr-lactate (ZrLa) in RO water while stirring. 328 mg PVAS-6 was dissolved in 3.9 g RO water and 2.0 g NaOH solution and its pH was adjusted to 6.11, and 550 mg ZrLa (5.5% Zr(IV)] was added into the above solution while stirring. The carboxyl groups/Zr(IV) molar ratio was 6:1. Zr(IV) loading in Zr-nanogel-43 was 4463 ppm. Detailed information regarding Zr-nanogel-43 is listed in Table 1.

Cr-PAsp Nanogel-2 with PolyAspartic acid (PAsp) (Mw =4-6 k) and CrAc by inverse-emulsion. In order to test nanogels based on other sources of carboxylate ions, we made a nanogel with polyaspartate (PAsp) in place of PVAS. A representative Cr(III)-loaded PAsp nanogel herein referred to as Cr-PAsp nanogel-2 was prepared using PAsp with Cr(III) as CrAc by inverse-emulsion. In such process, an aqueous mixture containing 921 mg PAsp, 232 mg CrAc and 4.6 g NaOH solution as the dispersed phase and an oil mixture of 2.41 g kerosene, 385 mg Span 83 and 217 mg PSH as a continuous phase were prepared. The inverse-emulsion was prepared by mixing the aqueous phase and the oil phase, followed by rapid homogenization using a sonicator. The carboxyl groups/Cr(III) molar ratio was 7:1. Cr(III) loading in Cr-PAsp nanogel-2 was around 6837 ppm. The mean particle size was around 400 nm. Detailed information regarding Cr-PAsp nanogel-2 is listed in Table 1.

Several gelation tests were performed on the various nanogels made herein to demonstrate the suitability of nanogels containing multivalent cations as crosslinking agents with delayed gelation times. The following examples show slower gelation rates with these crosslinkers compared with multivalent cation complexes typically used in gelation of partially hydrolyzed polyacrylamides.

Gelation of Cr-Nanogel-27, -28 and -30 with HPAM. In an oxygen-free glove box, 12.50 g of 2% HPAM solutions were added into 34.17 g of deoxygenated Synthetic Brine A in a beaker with stirring. Then 3.33 g of Cr-nanogel-27, Cr-Nanogel-28 or Cr-Nanogel-30 was added into the above mixture under stirring (final Cr(III) concentration was 100 ppm, final HPAM concentration was 0.5%). Finally the initial viscosity was recorded.

A Brookfield Digital Viscometer Model LVDV-II+PCP was used to monitor the viscosity changes of gelant and control solutions and determine the gel time of the gelant solutions. The gelation process was monitored as a function of time starting from the point of visual homogeneous dispersion. The gelation time was defined as the time when the viscosity of the gel solution increases abruptly to a value greater than 1000 cP (100% scales) at a shear rate of 2.25 $s^{-1}$. The temperature of the viscometer was controlled at the stated temperatures during the measurements.

The composition of Synthetic Brine A used in gelation experiments is listed in Table 2. A second Brine B composition used in later experiments is listed in Table 3. The various solutions were then divided into 6 ml vials and incubated at the indicated temperature(s). The viscosities of the samples were monitored as a function of aging time.

TABLE 2

Composition of Synthetic Brine A

| Component | Concentration, g/kg |
|---|---|
| NaCl | 22.982 |
| KCl | 0.151 |
| $CaCl_2 \cdot 2H_2O$ | 0.253 |
| $MgCl_2 \cdot 6H_2O$ | 1.071 |
| $NaHCO_3$ | 2.706 |
| $Na_2SO_4$ | 0.145 |
| Water | To 1000 g |
| pH | 8 |

TABLE 3

Composition of Synthetic Brine B

| Component | Concentration, g/kg |
|---|---|
| NaCl | 18.420 |
| KCl | 0.424 |
| $CaCl_2 \cdot 2H_2O$ | 0.550 |
| $MgCl_2 \cdot 6H_2O$ | 0.586 |
| $SrCl_2 \cdot 6H_2O$ | 0.061 |
| $NaHCO_3$ | 3.167 |
| $Na_2SO_4$ | 0.163 |
| Water | To 1000 g |
| pH | 8 |

Figure 5:
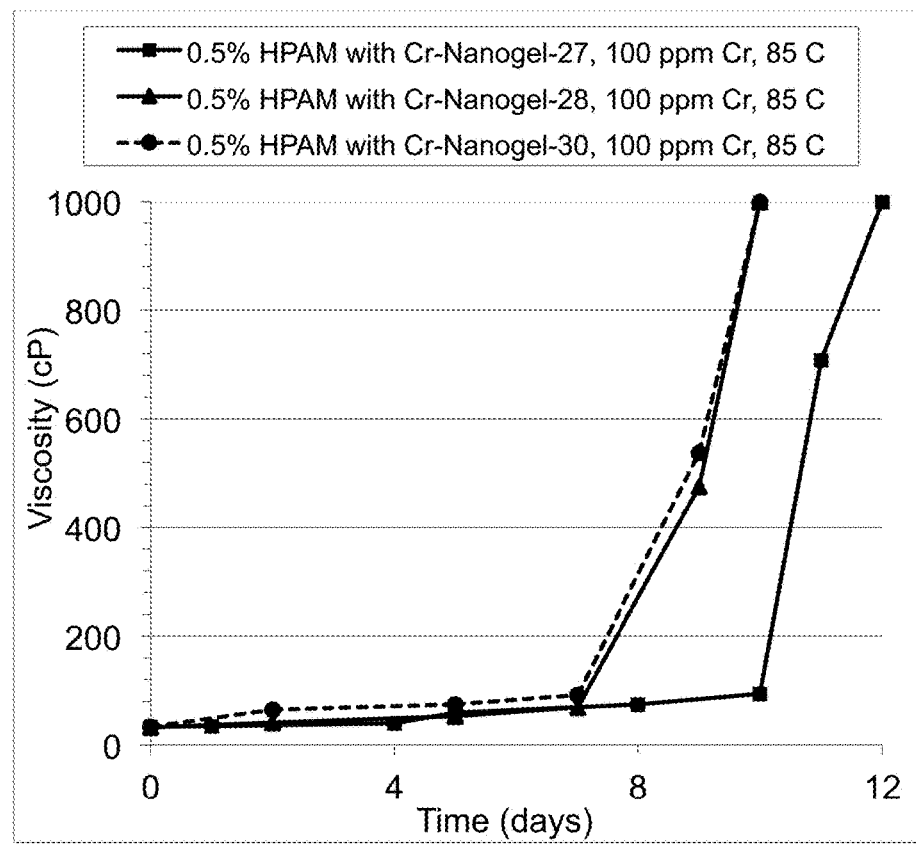
FIG. 5 shows the gelation of 0.5% HPAM in Brine A crosslinked with 100 ppm Cr(III) as Cr-nanogel-27, taking 12 days of aging to begin gelling at 85° C. This polymer would set to a gel within a few hours at 85° C. if the crosslinker was only Cr(III)-acetate. Using Cr-nanogel-28 and Cr-nanogel-30, gelation occurred at 10 days at 85° C. Therefore, the highest ratio of COOH/Cr (Cr-Nanogel-27) took the longest time to gel. This is because more COOH groups bind the Cr ions stronger, making them less available for crosslinking HPAM.

The results are shown in FIG. 5. As this figure shows, the delayed release of Cr(III) gelation agent from Cr-nanogel-27, -28 and -30 produced gels with HPAM is at a much slower rate than the prior art complexed multivalent cations used alone to gel HPAM.

Additionally, the highest carboxyl/Cr(III) ratio (6:1) held the Cr(III) tighter and gelled slower with HPAM. The other two ratios of 4.5 and 3 thus probably release Cr(III) easier, allowing more rapid gelation with HPAM. Thus, one way the gel time can be increased is by increasing the number of carboxylate groups in the nanogel.

Gelation of Cr-Nanogel-29 with HPAM. In an oxygen-free glove box, 12.50 g of 2% HPAM solution was added into 34.17 g of deoxygenated Synthetic Brine A in a beaker with stirring. Then 3.33 g of Cr-nanogel-29 containing CrAc and PVA succinate 6 k was added into the above mixture under stirring (final Cr(III) concentration was 100 ppm, final HPAM concentration was 0.5%). Finally, the initial viscosity was recorded. The solution was then divided into 6 ml vials and incubated at 85° C. The viscosities of the samples were monitored as a function of aging time.

Figure 6:
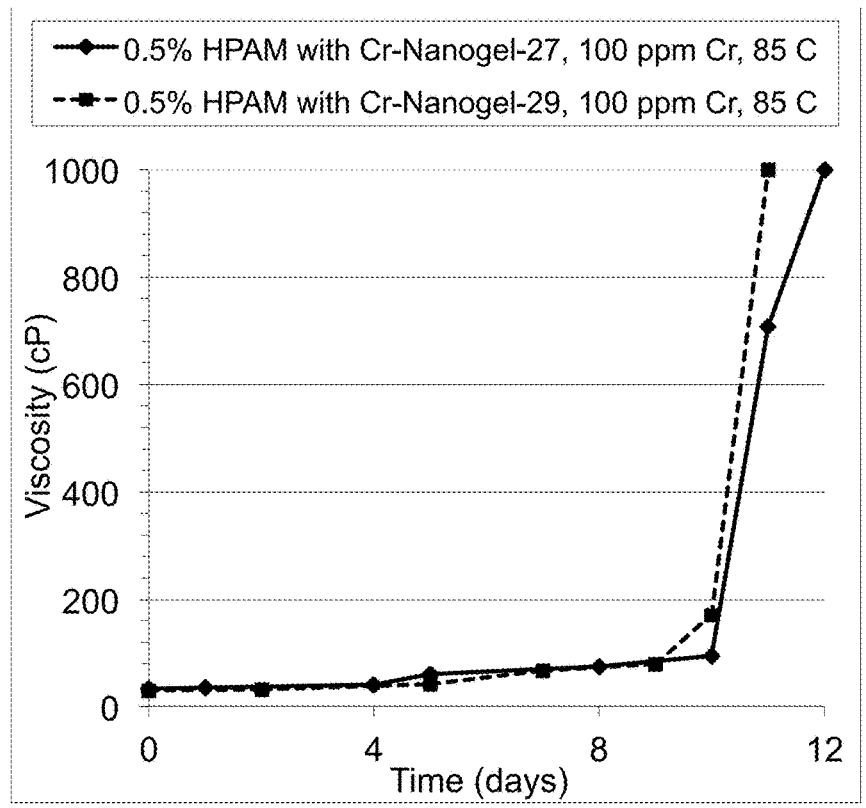
FIG. 6 shows the gelation of 0.5% HPAM in Brine A crosslinked with Cr-nanogel-27 (PVAS-25-6:1) and Cr-nanogel-29 (PVAS-6-6:1) containing 100 ppm Cr(III) aged at 85° C. As this plot shows, it took over 10 days of aging at 85° C. for this system to begin the gelation process. The two nanogels are made with different molecular weight polymers, but are somewhat different based on the vinyl acetate content as well, making it difficult to provide conclusive statements. However, the two polymers had the similar delays, indicating that the molecular weight of the polymer used to make the nanogel had little effect, at least at these conditions.

The results are shown in FIG. 6, which compares Cr-nanogel-29 (PVAS-6-6:1) and Cr-nanogel-27 (PVAS-25-6:1). As this figure shows, the delayed release Cr(III) gelation agent forms gels with HPAM at a much slower rate than the prior art complexed multivalent cations used alone to gel HPAM, which took only hours. However, the two nanogels made with different molecular weight PVAS took about the same time to gel, indicating that the molecular weight of the polymer used to make the nanogel is not a significant factor in delay time, at least under these conditions.

Figure 7:
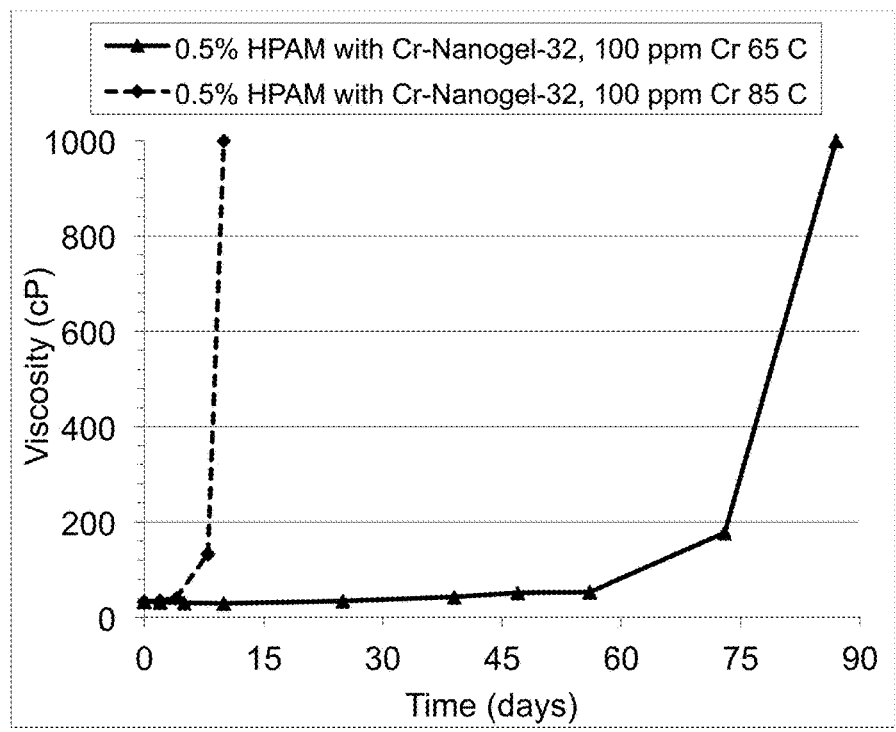
FIG. 7 shows the gelation results for a solution of 0.5% HPAM in Brine A crosslinked with 100 ppm Cr(III) in the form of Cr-nanogel-32 (PVAS-6-6:1 made by inverse emulsion) described below. This gelant began to gel in about 10 days of aging at 85° C. The same gelant solution began to gel after 10 weeks of aging at 65° C. Typically reaction rate double for every 10° C. rise in temperature. Thus, 85° C. is expected be about four times faster than 65° C.

Gelation of Cr-Nanogel-32 with HPAM. In an oxygen-free glove box, 2.08 g 30% inverting surfactant was dissolved in 106.27 g of deoxygenated Synthetic Brine A in a beaker with stirring. Then 4.15 g Cr-Nanogel-32 and 37.50 g of 2% HPAM were added into the above mixture under stirring (final Cr(III) concentration was 100 ppm, final HPAM concentration was 0.5%). Finally the initial viscosity was recorded. The solution was then divided into 6 ml vials and incubated at 65 and 85° C. The viscosities of the samples were monitored as a function of aging time. The results are shown in FIG. 7. As this figure shows, the lower temperature helped to greatly delay gel times for the Cr-Nanogel-32 (PVAS-6-6:1, 400 nm) from 10 days at 85° C. to about 80 days at 65° C.

Figure 8:
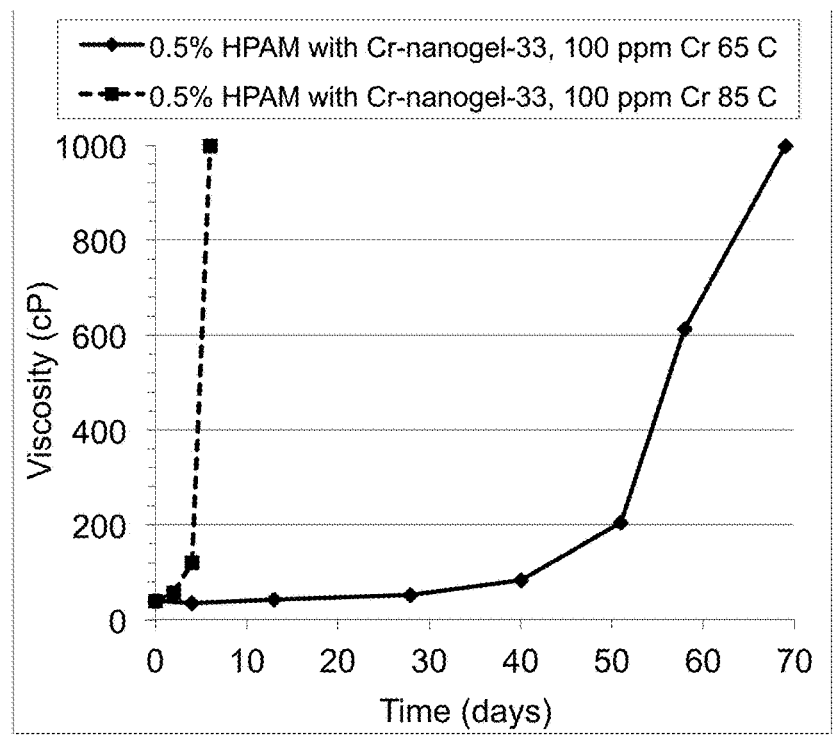
FIG. 8 shows the viscosity versus aging time for gelation of 0.5% HPAM in Brine A exposed to 100 ppm Cr in the form of Cr-nanogel-33 (PVAS-25-6:1, made by inverse emulsion) aged at 65° C. and 85° C. This gelant required about 65 days of aging at 65° C. and about 5 days at 85° C. to begin gelling. In this instance, the Cr-nanogel-33 was made in NaOH solution, which may have affected gelation time.

Gelation of Cr-Nanogel-33 with HPAM. In an oxygen-free glove box, 1.73 g 30% inverting surfactant was dissolved in 88.56 g of deoxygenated Synthetic Brine A in a beaker with stirring. 3.46 g Cr-nanogel-33 25 k and 31.25 g of 2% HPAM were added into the above mixture under stirring (final Cr(III) concentration was 100 ppm, final HPAM concentration was 0.5%), and then the initial viscosity was recorded. The solution was then divided into 6 ml vials and incubated at 65 and 85° C. The viscosities of the samples were monitored as a function of aging time. The results are shown in FIG. 8. The lower temperature delayed gel time, from 5 days at 85° C. to 65 days at 65° C. using this Cr-nanogel-33 (PVAS-25-6:1, 400 nm).

Gelation of Cr-Nanogel-32 with B29. We also sought to confirm that the delayed gelling effect was general, not limited to HPAM polymers. B29 is an expandable microparticle made in part with labile crosslinkers and with stable crosslinkers. The degree of polymerization is quite high, resulting in a very small microparticle that can be easily pumped and penetrate the fine pores of the reservoir. Once there, the high temperature and/or pH results in loss of the labile crosslinker bonds and the remaining polymer absorbs water, swelling greatly in situ. While viscous, these polymers are still subject to washout, and thus further crosslinking in situ is desirable. We therefore sought to determine if our delayed gelling agents could also be used with such microparticles.

In an oxygen-free glove box, 2.22 g 30% inverting surfactant was dissolved in 93.34 g of deoxygenated Synthetic Brine A in a beaker with stirring. Then 2.77 g Cr-nanogel-32 and 1.67 g 30% B29 were added into the above mixture under stirring (final Cr(III) concentration was 100 ppm, final B29 concentration was 0.5%) and finally the initial viscosity was recorded. The solution was then divided into 6 ml vials and incubated at 65 and 85° C. The viscosities of the samples were monitored as a function of time.

Figure 9:
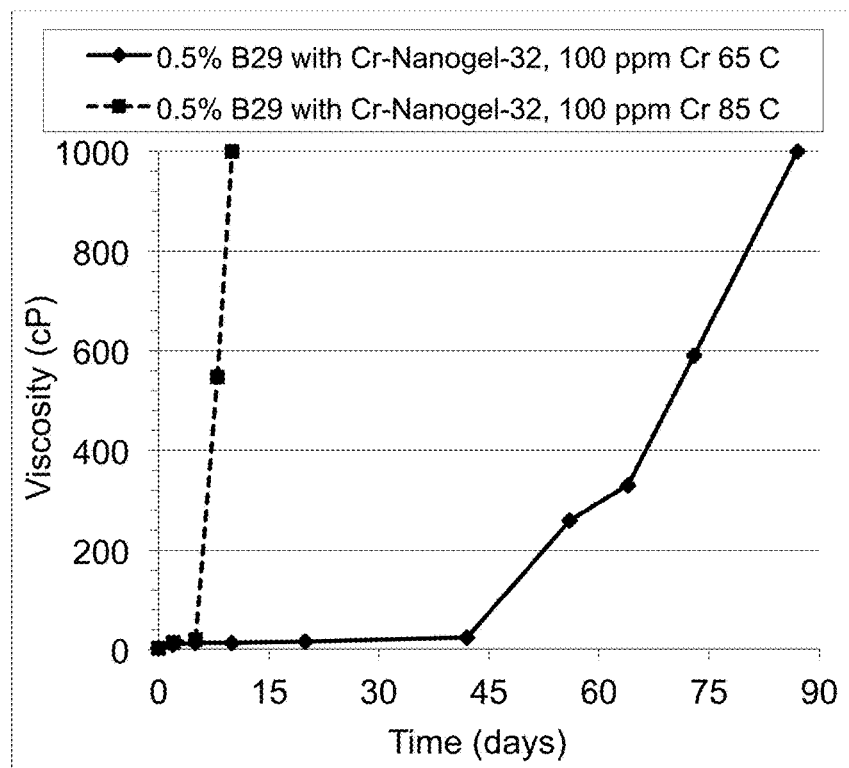
FIG. 9 summarizes gelation tests results for 0.5% B29 polymeric microparticle in Brine A exposed to 100 ppm Cr(III) in the form of Cr-nanogel-32 (PVAS-6-6:1 inverse emulsion) aged at 65° C. and 85° C. While the gelant aged at 65° C. took over 7 weeks of aging to begin gelling, the gelant aged at 85° C. began to gel in about 5 days of aging.

The results are shown in FIG. 9. The delayed release of Cr(III) from Cr-nanogel-32 (PVAS-6-6:1-400 nm) and slow popping of B-29 polymeric microparticles releasing HPAM results in slower gel formation. Delay ranged from 7 days at 85° C. to 80 days at 65° C. B29 is largely the same as HPAM once it is popped, but its degree of hydrolysis is a bit lower (5%), thus it gels a little slower.

Figure 10:
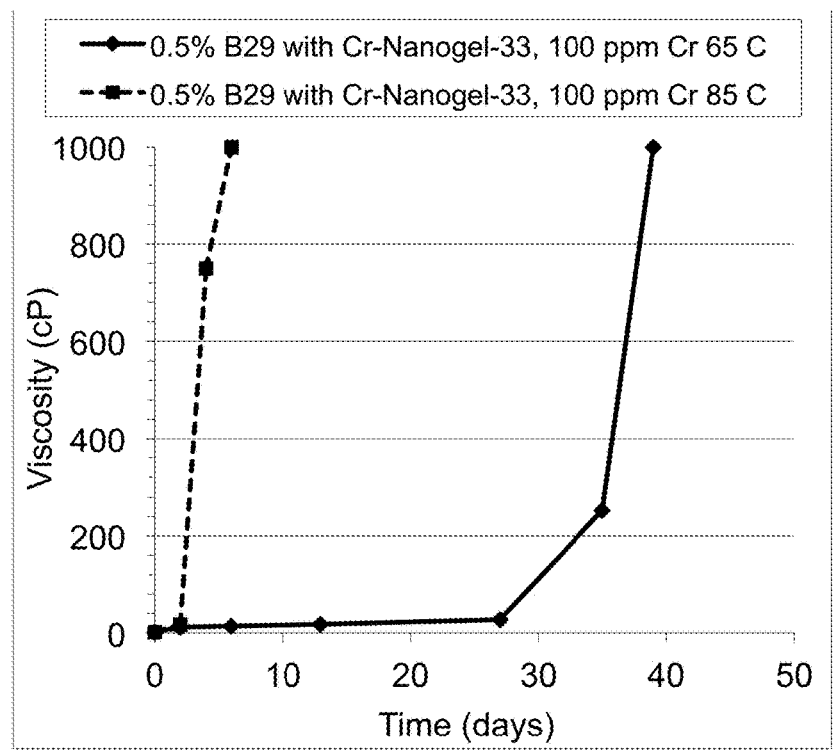
FIG. 10 shows viscosity versus aging time for 0.5% B29 polymeric microparticle in Brine A exposed to 100 ppm Cr(III) in the form of Cr-nanogel-33 (PVAS-25-6:1, inverse emulsion) aged at 65° C. and 85° C. While the gelant aged at 85° C. began to gel in about 5 days of aging, the gelant aged at 65° C. took over 5 weeks of aging to exhibit a substantial increase in viscosity.

Gelation of Cr-Nanogel-33 with B29. In an oxygen-free glove box, 2.23 g 30% inverting surfactant was dissolved in 93.32 g of deoxygenated Synthetic Brine A in a beaker with stirring, and then 2.78 g Cr-nanogel-33 and 1.67 g of 30% B29 were added into the above mixture under stirring (final Cr(III) concentration was 100 ppm, final B29 concentration was 0.5%). Finally the initial viscosity was recorded. The solution was then divided into 6 ml vials and incubated at 65 and 85° C. The viscosities of the samples were monitored as a function of aging time and results are shown in FIG. 10. As shown, the delay times for Cr-nanogel-33 (PVAS-25-6:1, 400 nm) were somewhat reduced as compared with Cr-nanogel-32 (PVAS-6-6:1-400 nm) from about 5 days at 85° C. to about 35 days at 65° C. While preparing Cr-Nanogel-33, we dissolved PVAS-25 in NaOH solution, because it was difficult to dissolve it in water, before adding the CrAc. Thus, the NaOH probably accelerated Cr release from the nanogel.

Figure 11:
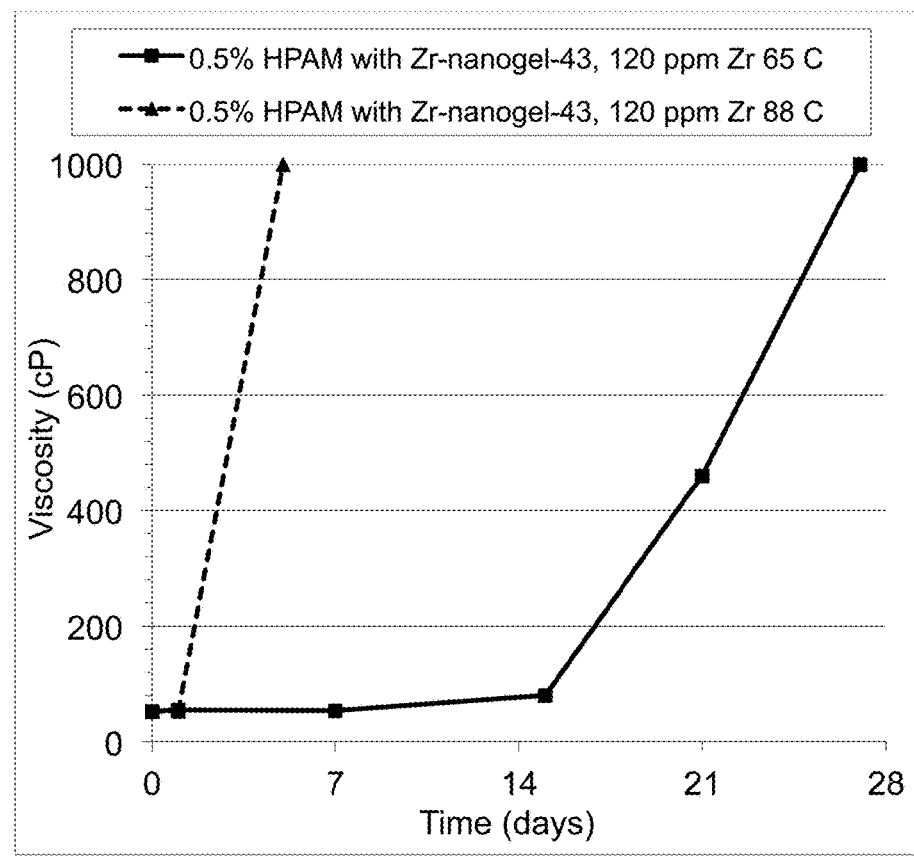
FIG. 11 shows viscosity versus aging time for 0.5% HPAM with Zr-nanogel-43 [Zr(IV) concentration of 120 ppm] in Synthetic Brine A without $NaHCO_3$ at 65 and 88° C. While the PVAS-6-6:1 gelant aged at 65° C. took over around three weeks of aging to begin gelling, the gelant aged at 85° C. began to gel in about 2-5 days of aging.

Gelation of Zr-Nanogel-43 with HPAM. In an oxygen-free glove box, 25 g of 2% HPAM solutions were added into 72.29 g of deoxygenated Synthetic Brine A without $NaHCO_3$ in a beaker with stirring. Then 2.71 g of Zr-nanogel-43 containing ZrLa and PVAS-6-6:1 was added into the above mixture under stirring (final Zr(IV) concentration was 120 ppm, final HPAM concentration was 0.5%), and the initial viscosity recorded. The solution was then divided into 6 ml vials and incubated at 85° C. The viscosities of the samples were monitored as a function of aging time. The results are shown in FIG. 11. As this figure shows, the delayed release of Zr(IV) results in gel formation with HPAM at a much slower rate than the prior art complexed multivalent cations used alone to gel HPAM. The lower temperature helped to greatly delay gel times for the Zr-Nanogel-43 from 2 to ~5 days at 88° C. to around three weeks at 65° C.

Figure 12:
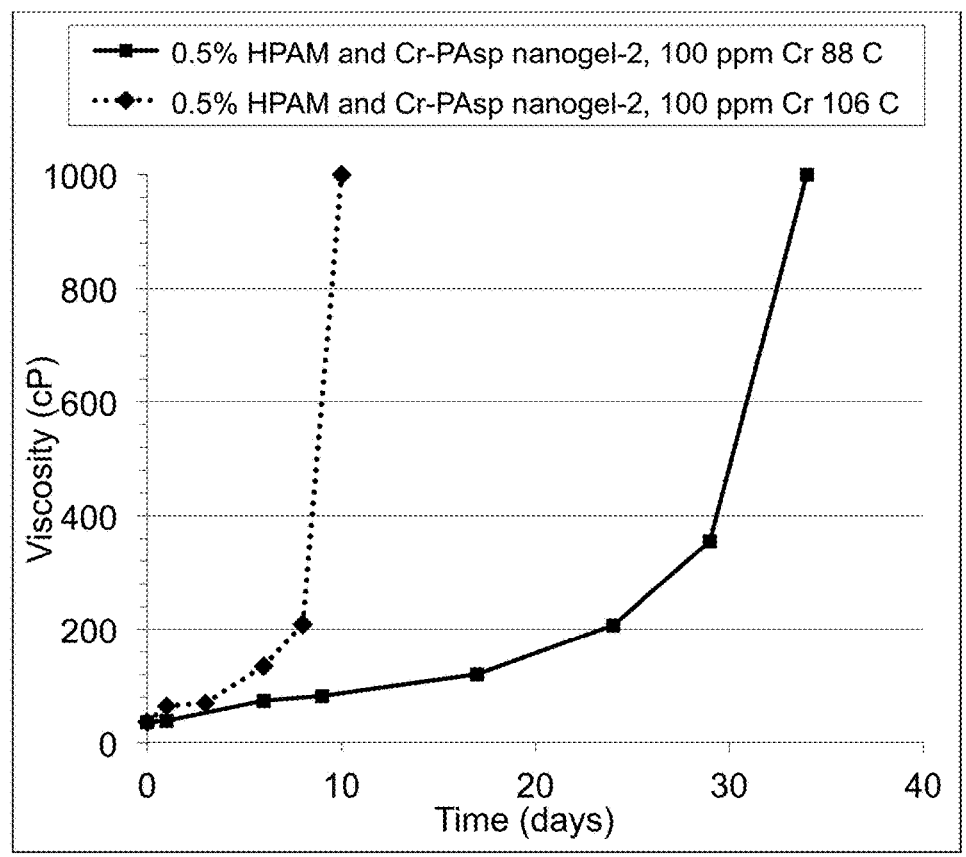
FIG. 12 shows viscosity versus aging time for 0.5% HPAM with 100 ppm Cr(III) as Cr-PAsp nanogel-2 in Synthetic Brine B at 88° C. and 106° C. While the gelant aged at 88° C. took over around 34 days of aging to begin gelling the gelant aged at 106° C. began to gel in about 10 days of aging.

Gelation of Cr-PAsp Nanogel-2 with HPAM. In an oxygen-free glove box, 50 g of 1% HPAM solutions in Synthetic Brine B were added into 47.81 g of deoxygenated Synthetic Brine B with 0.73 g 30% inverting surfactant in a beaker with stirring. Then 1.46 g of Cr-PAsp nanogel-2 containing CrAc and PAsp was added into the above mixture under stirring (final Cr(III) concentration was 100 ppm, final HPAM concentration was 0.5%), and the initial viscosity recorded. The solution was then divided into 6 ml vials and incubated at 88° C. The viscosities of the samples were monitored as a function of aging time. The results are shown in FIG. 12. As shows, the delayed release of Cr(III) results in gel formation with HPAM at a much slower rate than the prior art complexed multivalent cations used alone to gel HPAM. The lower temperature helped to greatly delay gel times for the Cr-PAsp nanogel-2 from 10 days at 106° C. to 34 days at 88° C. Also, Cr-PAsp nanogel-2 with HPAM had much longer gelation delay than all PVA succinate nanogels, because PAsp hydrolyzed much slower than PVA succinate, probably due to greater stability of the amide bonds over ester bonds. Based on these results, we predict that polyglutamate, and other polymers having pendant carboxylates and amide bonds should produce a long gel delay time.

Figure 13:
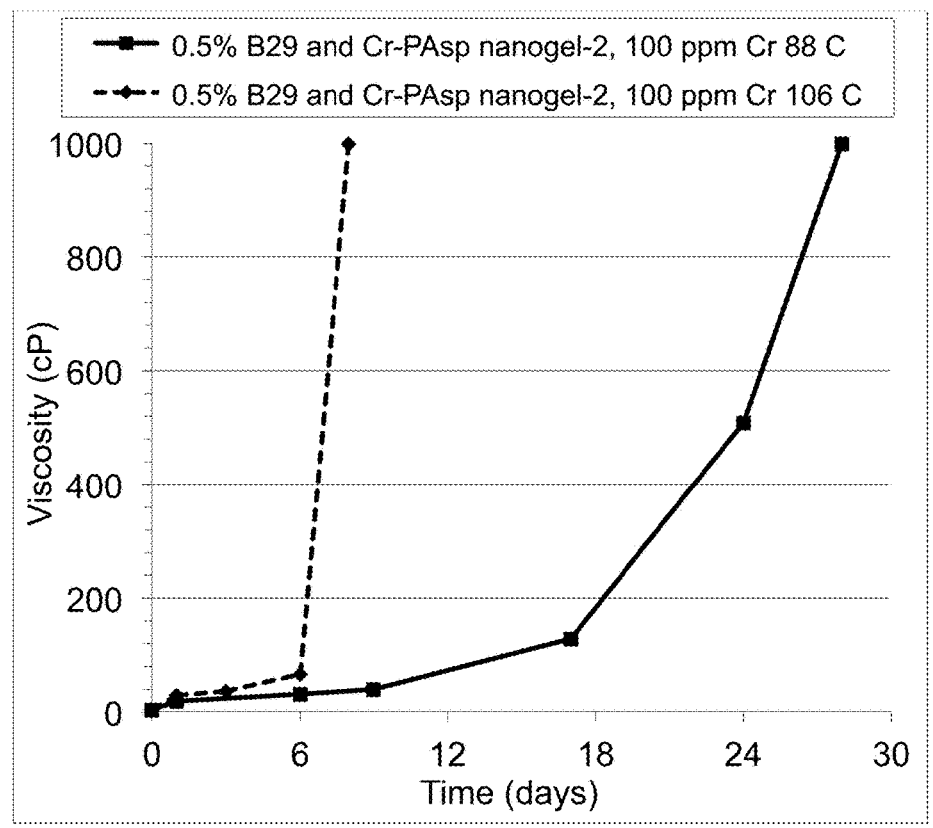
FIG. 13 shows viscosity versus aging time for 0.5% B29 with 100 ppm Cr(III) as Cr-PAsp nanogel-2 in Synthetic Brine B at 88 and 106° C. While the gelant aged at 88° C. took over around 28 days of aging to begin gelling the gelant aged at 106° C. began to gel in about 8 days of aging.

Gelation of Cr-PAsp Nanogel-2 with B29. In an oxygen-free glove box, 1.67 g of 30% B29 were added into 95.3 g of deoxygenated Synthetic Brine B with 1.57 g 30% inverting surfactant in a beaker with stirring. Then 1.46 g of Cr-PAsp nanogel-2 was added into the above mixture under stirring (final Cr(III) concentration was 100 ppm, final B29 concentration was 0.5%), and the initial viscosity recorded. The solution was then divided into 6 ml vials and incubated at 88° C. or 106° C., viscosities were monitored and results are shown in FIG. 13. The delayed release of Cr(III) results in gel formation with HPAM at a much slower rate than the prior art complexed multivalent cations used alone to gel HPAM. The lower temperature helped to greatly delay gel times for the Cr-PAsp nanogel-2 from 8 days at 106° C. to 28 days at 88° C. Also, Cr-PAsp nanogel-2 with B29 had much longer gelation delay than all PVA succinate nanogels, because PAsp hydrolyzed much slower than PVA succinate, and this effect is independent of the injection polymer used.

Preparation of $CrCl_3$-PVAS and $CrCl_3$-PAsp nanogels using $CrCl_3$ as Cr(III) source. A representative Cr(III)-loaded PVAS nanogel herein referred to as $CrCl_3$-PVAS was prepared through mixing PVAS-6 with Cr(III) as $CrCl_3$ in Reverse Osmosis (RO) water while stirring. 573 mg PVAS-6 was dissolved in 11.44 g RO water with 0.60 g of 10.19% NaOH and 3.42 g Cr(III) solution (8761 ppm Cr(III)) was added into the above solution while stirring. The carboxyl groups/Cr(III) molar ratio is 6:1. Cr(III) loading in $CrCl_3$-PVAS was around 1869 ppm.

$CrCl_3$-PAsp nanogel was prepared using the same procedure. A representative Cr(III)-loaded PAsp nanogel herein referred to as $CrCl_3$-PAsp was prepared through mixing PAsp with Cr(III) as $CrCl_3$ in Reverse Osmosis (RO) water while stirring. 653 mg PAsp was dissolved in 7.88 g RO water with 3.53 g of 10.19% NaOH and after pH was adjusted to 7.63 by addition of 2.57 g 1 N HCl, 5.45 g Cr(III) solution (9036 ppm Cr(III)) was added into the above solution while stirring. The carboxyl groups/Cr(III) molar ratio is 6:1. Cr(III) loading in $CrCl_3$-PAsp was around 2452 ppm.

Figure 14:
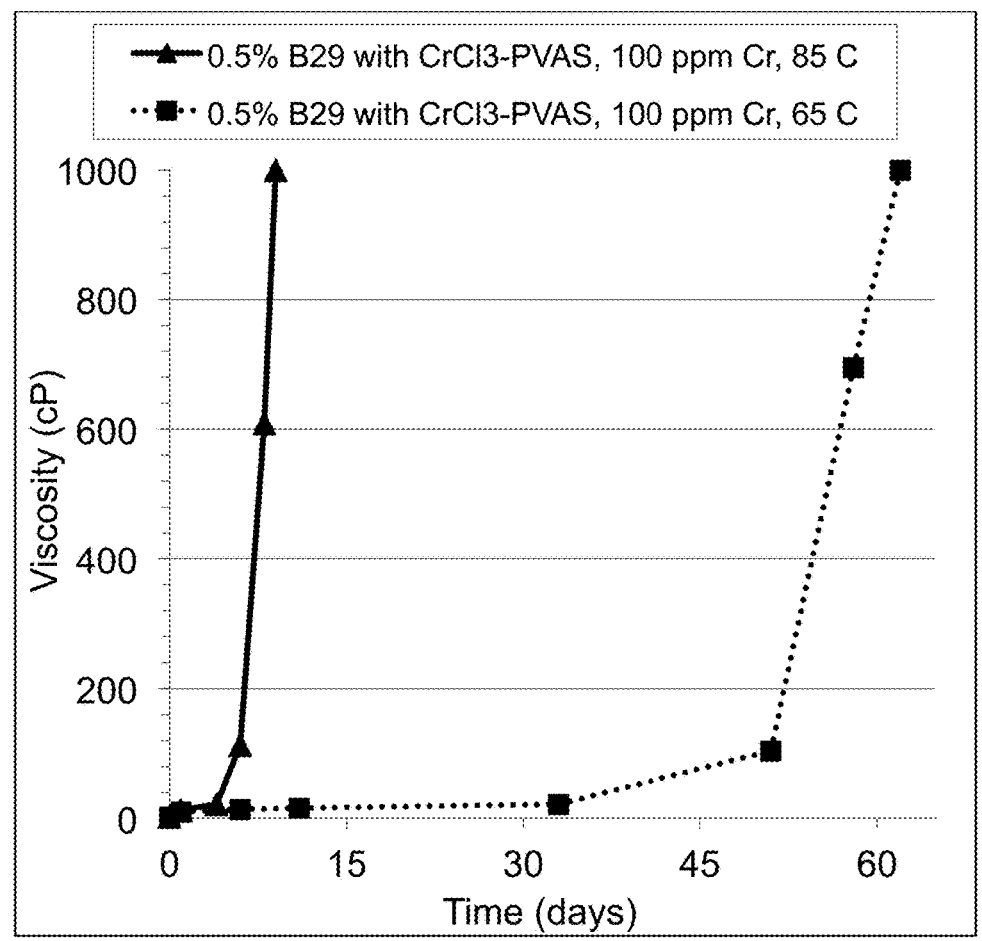
FIG. 14 shows viscosity versus aging time for 0.5% B29 with 100 ppm Cr(III) as $CrCl_3$-PVAS in Synthetic Brine A at 65 and 85 ° C. While the gelant aged at 65° C. took over around 62 days of aging to begin gelling, the gelant aged at 85° C. began to gel in about 9 days of aging.
Figure 15:
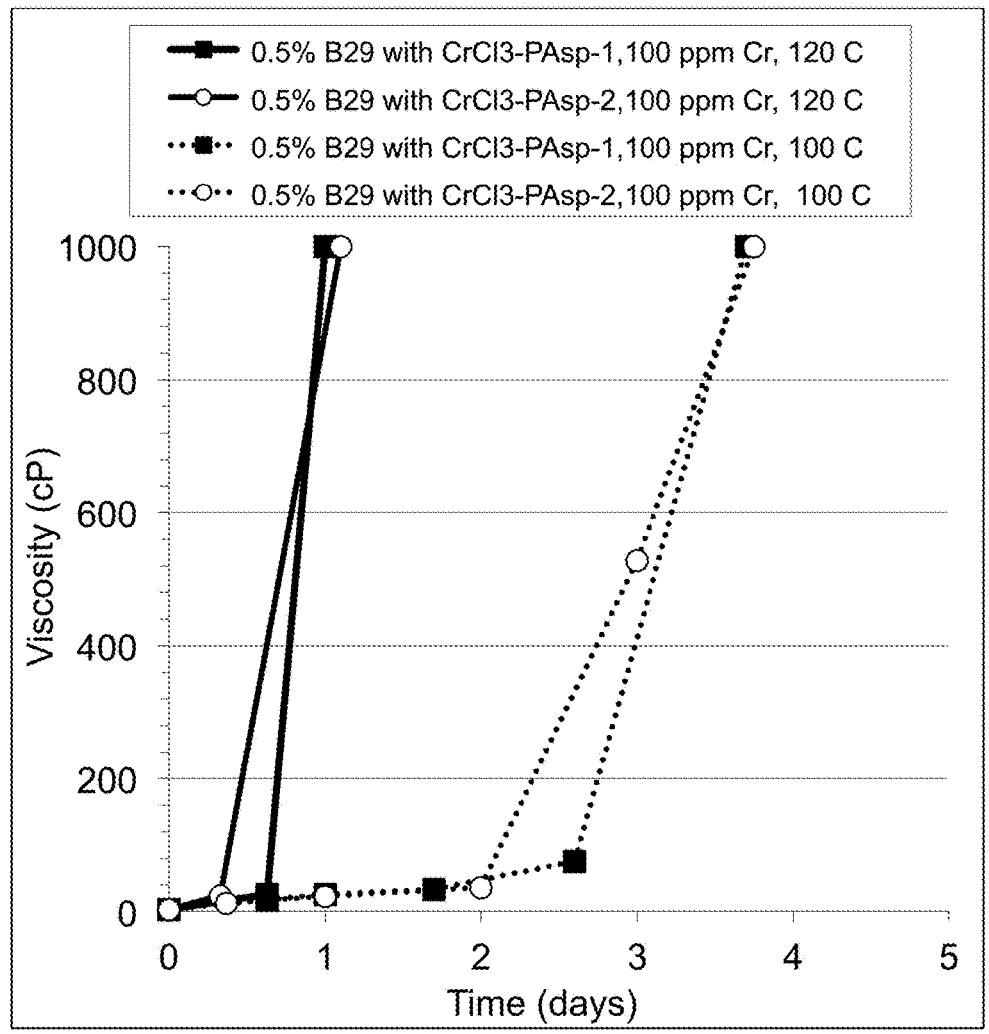
FIG. 15 shows viscosity versus aging time for 0.5% B29 with 100 ppm Cr(III) as CrCl$_3$-PAsp (CrCl$_3$-PAsp-1 and CrCl$_3$-PAsp-2 are the same formulation, used to prove the reproducibility of gelation delay) in Synthetic Brine A at 100 and 120° C. While the gelant aged at 120° C. took about 1 day of aging to begin gelling the gelant aged at 100° C. began to gel in about 3-4 days of aging.

Gelation of $CrCl_3$-PVAS with B29. In an oxygen-free glove box, 0.83 g 30% inverting surfactant was dissolved in 92.15 g of deoxygenated Synthetic Brine A in a beaker with stirring. 5.35 g $CrCl_3$-PVAS and 1.67 g of 30% B29 were added into the above mixture while stirring (final Cr(III) concentration was 100 ppm, final B29 concentration was 0.5%) and initial viscosity recorded. The solution was then divided into 6 ml vials and incubated at 65 and 85° C., and viscosities monitored as a function of time. FIG. 14 shows viscosity versus aging time for 0.5% B29 with 100 ppm Cr(III) as $CrCl_3$-PVAS in Synthetic Brine A at 65 and 85° C. While the gelant aged at 65° C. took over around 62 days of aging to begin gelling the gelant aged at 85° C. began to gel in about 9 days of aging. FIG. 15 shows viscosity versus aging time for 0.5% B29 with 100 ppm Cr(III) as $CrCl_3$-PAsp ($CrCl_3$-PAsp-1 and $CrCl_3$-PAsp-2 are the same formulation, used to prove the reproducibility of gelation delay) in Synthetic Brine A at 100 and 120° C. While the gelant aged at 120° C. took about 1 day of aging to begin gelling the gelant aged at 100° C. began to gel in about 3-4 days of aging.

Figure 16:
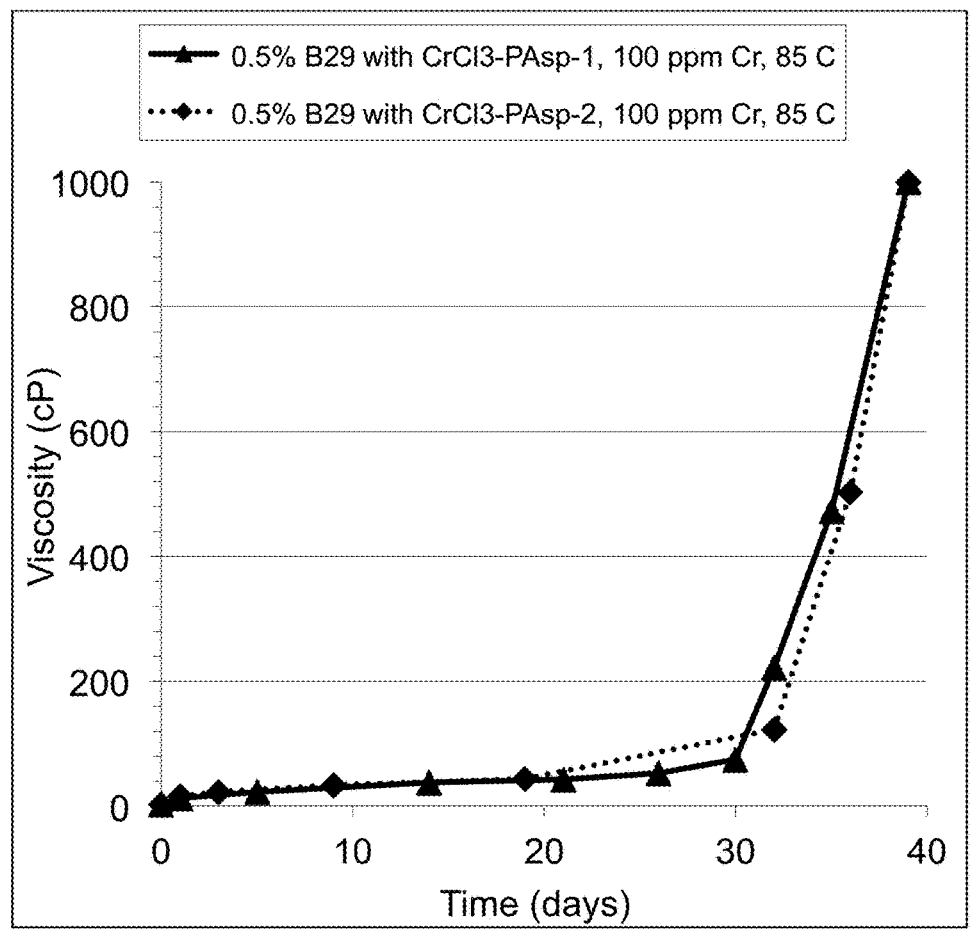
FIG. 16 shows viscosity versus aging time for 0.5% B29 with 100 ppm Cr(III) as CrCl$_3$-PAsp (CrCl$_3$-PAsp-1 and CrCl$_3$-PAsp-2 are the same formulation, used to prove the reproducibility of gelation delay) in Synthetic Brine A at 85° C. The gelant took over around 39 days of aging to begin gelling aged at 85° C.

Gelation of $CrCl_3$-PAsp with B29. In an oxygen-free glove box, 0.83 g 30% inverting surfactant was dissolved in 93.42 g of deoxygenated Synthetic Brine A in a beaker with stirring. Then, 4.08 g $CrCl_3$-PAsp and 1.67 g 30% B29 were added into the above mixture while stirring (final Cr(III) concentration was 100 ppm, final B29 concentration was 0.5%) and initial viscosity was recorded. The solution was then divided into 6 ml vials and incubated at 85, 100 and 120° C. The viscosities of the samples were monitored as a function of time. FIG. 16 shows viscosity versus aging time for 0.5% B29 with 100 ppm Cr(III) as $CrCl_3$-PAsp ($CrCl_3$-PAsp-1 and $CrCl_3$-PAsp-2 are the same formulation, used to prove the reproducibility of gelation delay) in Synthetic Brine A at 85° C. The gelant took over around 39 days of aging to begin gelling aged at 85° C.

Gelation of $CrCl_3$-PAsp with HPAM. In an oxygen-free glove box, 100 g of 1% HPAM solution in Synthetic Brine A was added into 91.84 g of deoxygenated Synthetic Brine A in a beaker with stirring. Then 8.16 g of $CrCl_3$-PAsp was added into the above mixture under stirring (final Cr(III) concentration was 100 ppm, final HPAM concentration was 0.5%) and initial viscosity was recorded. The solution was then divided into 6 ml vials and incubated at 100 and 120°

Figure 17:
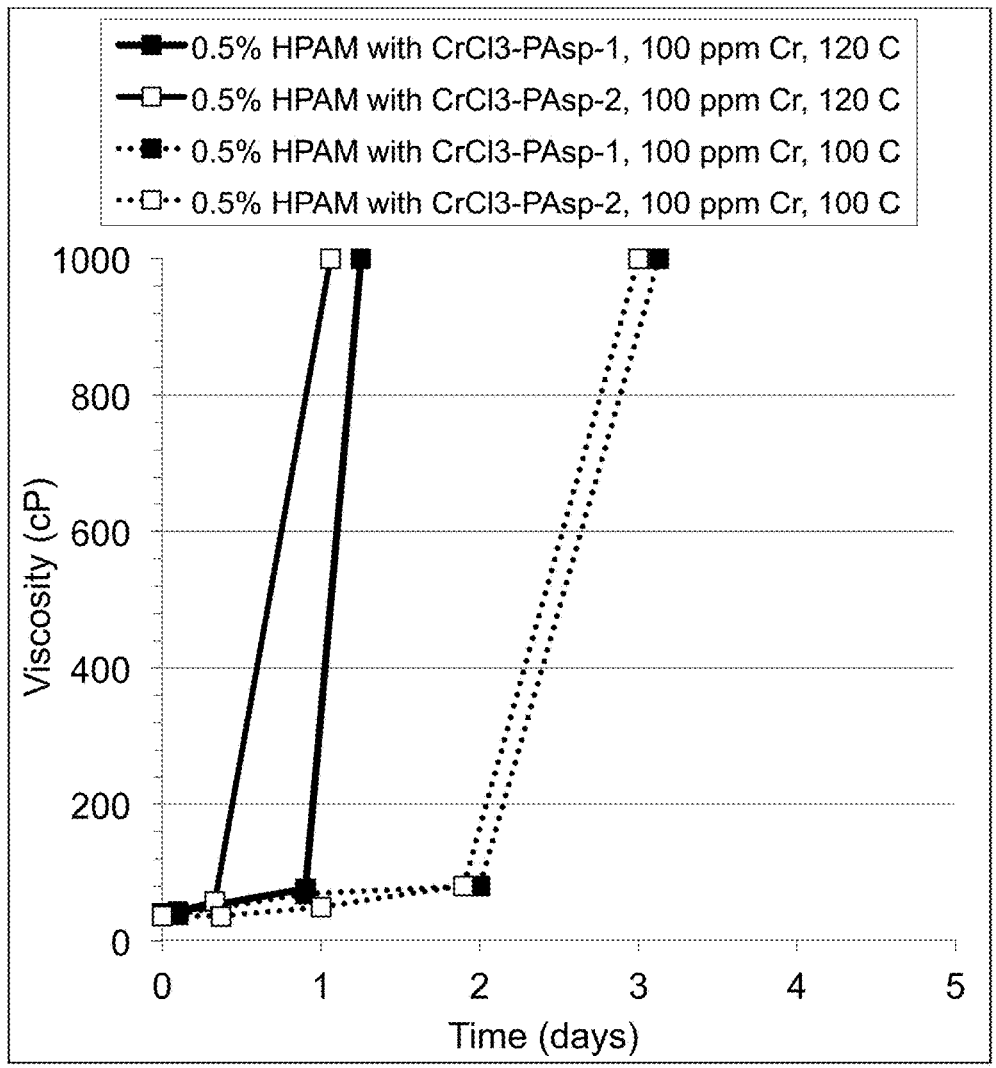
FIG. 17 shows viscosity versus aging time for 0.5% HPAM with 100 ppm Cr(III) as CrCl$_3$-PAsp (CrCl$_3$-PAsp-1 and CrCl$_3$-PAsp-2 are the same formulation, used to prove the reproducibility of gelation delay) in Synthetic Brine A at 100 and 120° C. While the gelant aged at 120° C. took about 1 days of aging to begin gelling the gelant aged at 100° C. began to gel in about 2-3 days of aging.
Figure 18:
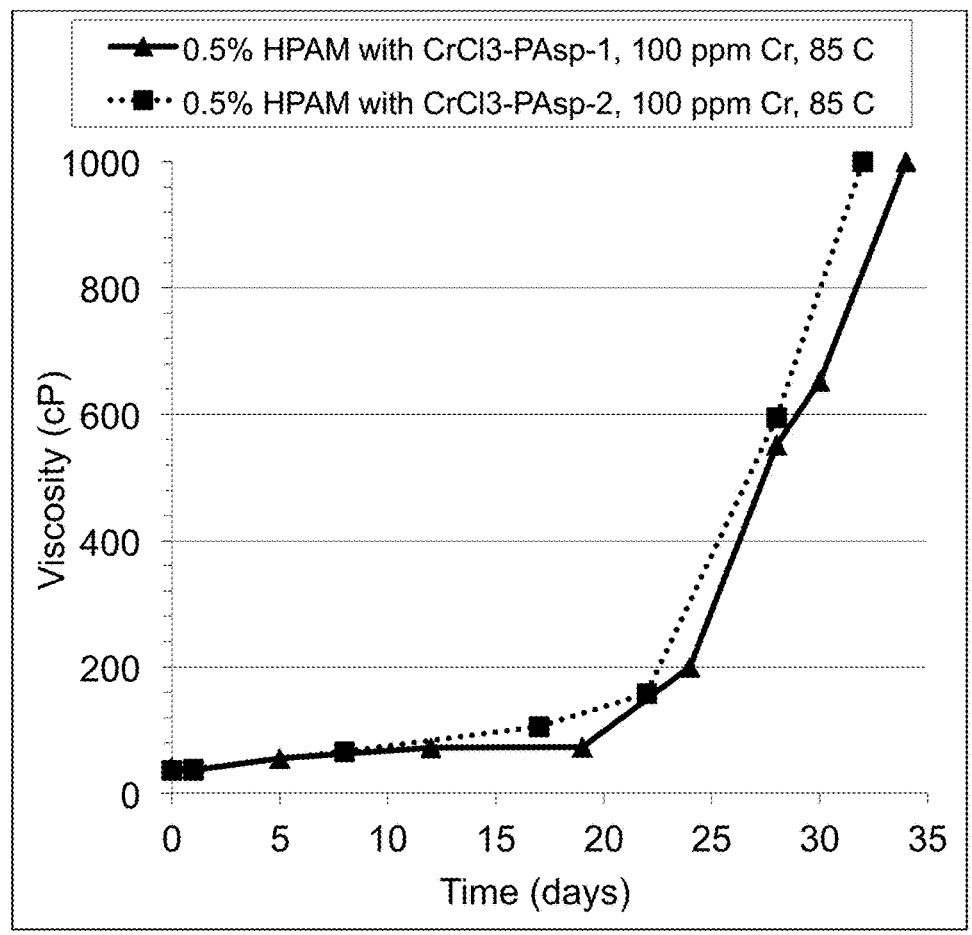
FIG. 18 shows viscosity versus aging time for 0.5% HPAM with 100 ppm Cr(III) as CrCl$_3$-PAsp (CrCl$_3$-PAsp-1 and CrCl$_3$-PAsp-2 are the same formulation, used to prove the reproducibility of gelation delay) in Synthetic Brine A at 85° C. The gelant took over around 30 days of aging to begin gelling aged at 85 ° C.

C. The viscosities of the samples were monitored as a function of aging time. FIG. 17 shows viscosity versus aging time for 0.5% HPAM with 100 ppm Cr(III) as $CrCl_3$-PAsp ($CrCl_3$-PAsp-1 and $CrCl_3$-PAsp-2 are the same when aged at the same temperature. These results indicate the reproducibility of gelation delay in Synthetic Brine A at 100 and 120° C. While the gelant aged at 120° C. took about 1 day of aging to begin gelling the gelant aged at 100° C. began to gel in about 2-3 days of aging. FIG. 18 shows viscosity versus aging time for 0.5% HPAM with 100 ppm Cr(III) as $CrCl_3$-PAsp ($CrCl_3$-PAsp-1 and $CrCl_3$-PAsp-2 are the same formulation, used to prove the reproducibility of gelation delay) in Synthetic Brine A at 85° C. The gelant took over around 30 days of aging to begin gelling aged at 85° C.

The following references are incorporated by reference in their entirety for all purposes.

1. Needham, R. B., et al., "Control of Water Mobility Using Polymers and Multivalent Cations," Paper SPE 4747 Presented at Improved Oil Recovery of SPE, Tulsa, Okla., Apr. 22-24, 1974.
2. Threlkeld, C. B., et al., "Method for Reducing the Permeability of Subterranean Formations to Brines," United States Patent 3,949,811, Apr. 13, 1976.
3. Mumallah, N., "Chromium (III) Propionate: A Crosslinking Agent for Water-Soluble Polymers in Hard Oilfield brines," SPE reservoir Engineering, February 1988, PP 243-250.
4. Sydansk, R. D., "A New Conformance-Improvement-Treatment Chromium (III) Gel Technology," Paper SPE/DOE 17329, Presented at the SPE/DOE Enhanced Oil Recovery Symposium, Tulsa, Okla. Apr. 17-20, 1988.
5. Sydansk, R. D., "Field Testing of a New Conformance-Improvement-Treatment Chromium (III) Gel Technology," Paper SPE/DOE 17383, Presented at the SPE/DOE Enhanced Oil Recovery Symposium, Tulsa, Okla. Apr. 17-20, 1988.
6. Sydansk, R. D., "A Newly Developed Chromium (III) Gel Technology," SPE Reservoir Engineering, August 1990, pp 346-352.
7. Sydansk, R. D., "More Than 12 Years' Experience With a Successful Conformance-Control Polymer-Gel Technology," Paper SPE 49315, Presented at 1998 SPE Annual Technical. Conference & Exhibition, New Orleans, La., Sep. 27-30, 1998.
8. Sydansk, R. D., "More Than 12 Years' Experience With a Successful Conformance-Control Polymer-Gel Technology," Paper SPE 62561, Presented at 2000 SPE/AAPG Western Regional Meeting, Long Beach, Calif. Jun. 19-23, 2000.
9. Sydansk, R. D., "Acrylamide-Polymer/Chromium (III)-Carboxylate Gels for Near Wellbore Matrix Treatments," SPE Advanced Technology Series, Vol 1. No 1, pp146-152.
10. Sydansk, R. D. & Argabright, P. A., "Conformance Improvement in a Subterranean Hydrocarbon-Bearing Formation Using a Polymer Gel," U.S. Pat. No. 4,683,949, Aug. 4, 1987.
11. Sydansk, R. D., "Hydrocarbon Recovery Process Utilizing a gel Prepared From a Polymer and a Preferred Crosslinking Agent," U.S. Pat. No.5,415,229, May 16, 1995.
12. Sydansk, R. D., "Process for Reducing Permeability in a Subterranean Hydrocarbon-Bearing Formation," U.S. Pat. No. 5,421,411, Jun. 6, 1995
13. Moffitt, P., et al., "Development and Field Testing of a New Low Toxicity Polymer Crosslinking System," Paper, SPE 35173, Presented at the Permian Basin Oil and Gas Recovery Conference, Midland, Tex., Mar. 27-29, 1998.
14. Albonico, P., et al., "Effective Gelation-Delaying Additives for Cr+3/Polymer Gels," Paper SPE 25221, Presented at the SPE International Symposium on Oilfield Chemistry, New Orleans, La., Mar. 2-5, 1993.
15. Albonico, P., et al., "New Polymer Gels for Reducing water Production in High-Temperature Reservoirs," Paper SPE 27609, Presented at European Production Operations Conference and Exhibition, Aberdeen, U.K. Mar. 15-17, 1994.
16. Bartosek, M., et al., "Polymer Gels for Conformance Treatments: Propagation of Cr(III) Crosslinking Complexes in Porous Media," Paper SPE/DOE 27828, Presented at the SPE/DOE Ninth Symposium on Improved Oil Recovery, Tulsa, Okla. Apr. 17-20 1994.
17. Broseta, D., et al., "Rheological Screening of Low Molecular Weight Polyacrylamide/Chromium(III) Acetate Water Shutoff Gels, Paper SPE 59319, Presented at the 2000 SPE/DOE Improved Oil Recovery Symposium, Tulsa, Okla. Apr. 3-5 2000.
18. Albonico, P. & Lockhart, T. P., "Divalent Ion-Resistant Polymer gels for High-Temperature Applications: Syneresis Inhibiting additives," Paper SPE 25220, Presented at SPE International Symposium on Oilfield Chemistry, New Orleans, La., Mar. 2-5, 1993.
19. Lockhart, T. P., "Chemical properties of Chromium/Polyacrylamide gels," SPE Advanced Technology Series, Vol2, No 2. pp 199-205.
20. Sanchez-Chaves, M., et al., "Poly (vinyl alcohol) functionalized by monosuccinate groups. Coupling of bioactive amino compounds" Polymer, Vol. 39, No. 13, 2751-2757, 1998.
21. U.S. Pat. No. 3,749,172.

The invention claimed is:

1. A degradable nanogel composition comprising polyvinyl alcohol (PVA) succinate or PVA malate or polyasparate bound to a multivalent metal ion comprising chromium, zirconium, iron, aluminum, titanium or combinations thereof in at 6 to 1 ratio, said degradable nanogel composition lasting at least 30 days in said nanogel form at 65° C. in a brine solution having 23 g/l NaCl, and thereafter degrading by breaking bonds between carboxyl groups in said polyvinyl alcohol (PVA) succinate or PVA malate or polyasparate and said multivalent metal ion, and thereby releasing said multivalent metal ion.

2. A degradable composition comprising polyvinyl alcohol (PVA) succinate or PVA malate or polyasparate, wherein carboxyl groups in said polyvinyl alcohol (PVA) succinate or PVA malate or polyasparate are bound to a multivalent metal ion comprising chromium, zirconium, iron, aluminum, titanium or combinations thereof in a 6 to 1 ratio of said polyvinyl alcohol (PVA) succinate or PVA malate or polyasparate to said multivalent metal ion, said degradable composition lasting at least 10 days at 85° C. in a brine solution having 23 g/l NaCl, and thereafter degrading by breaking bonds between carboxyl groups in said polyvinyl alcohol (PVA) succinate or PVA malate or polyasparate and said multivalent metal ion, and thereby releasing said multivalent metal ion.

* * * * *